(12) United States Patent
Yamada et al.

(10) Patent No.: US 9,238,422 B2
(45) Date of Patent: Jan. 19, 2016

(54) VEHICLE SEAT SLIDING APPARATUS

(71) Applicant: Aisin Seiki Kabushiki Kaisha, Kariya-shi (JP)

(72) Inventors: Yukifumi Yamada, Toyota (JP); Naoki Goto, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 81 days.

(21) Appl. No.: 14/190,262

(22) Filed: Feb. 26, 2014

(65) Prior Publication Data

US 2014/0239140 A1    Aug. 28, 2014

(30) Foreign Application Priority Data

Feb. 28, 2013 (JP) .................. 2013-039093

(51) Int. Cl.
*B60R 21/207* (2006.01)
*B60N 2/07* (2006.01)
*B60N 2/08* (2006.01)
*B60N 2/42* (2006.01)

(52) U.S. Cl.
CPC ............ *B60N 2/07* (2013.01); *B60N 2/0705* (2013.01); *B60N 2/0818* (2013.01); *B60N 2/0875* (2013.01); *B60N 2/43* (2013.01); *B60R 21/207* (2013.01)

(58) Field of Classification Search
CPC .......... B60N 2/07; B60N 2/43; B60N 2/0818; B60N 2/0705; B60N 2/0875; B60R 21/207
See application file for complete search history.

(56) References Cited

U.S. PATENT DOCUMENTS

| 8,353,531 | B2 | 1/2013 | Miyajima | |
|---|---|---|---|---|
| 9,045,060 | B2 * | 6/2015 | Zaiki | B60N 2/0705 |
| 2014/0110553 | A1 * | 4/2014 | Hoshihara | B60N 2/06 248/429 |
| 2015/0001366 | A1 * | 1/2015 | Nakashima | B60N 2/0722 248/429 |
| 2015/0048603 | A1 * | 2/2015 | Zaiki | B60N 2/0705 280/730.2 |

FOREIGN PATENT DOCUMENTS

| JP | 2-126937 U | 10/1990 |
|---|---|---|
| JP | 2011-213195 | 10/2011 |

* cited by examiner

*Primary Examiner* — Drew Brown
(74) *Attorney, Agent, or Firm* — Oblon, McClelland, Maier & Neustadt, L.L.P.

(57) ABSTRACT

A vehicle seat sliding apparatus includes: an upper rail configured to freely support a seat thereabove; a lower rail supporting the upper rail in a relatively movable manner; a locking mechanism capable of switching between a lock state where the relative movement of the upper rail with respect to the lower rail is regulated and an unlock state where the relative movement is allowed; and an unlock operation prevention mechanism regulating an unlock operation of the locking mechanism based on a deployment pressure of an airbag which is disposed in a seat cushion.

5 Claims, 19 Drawing Sheets

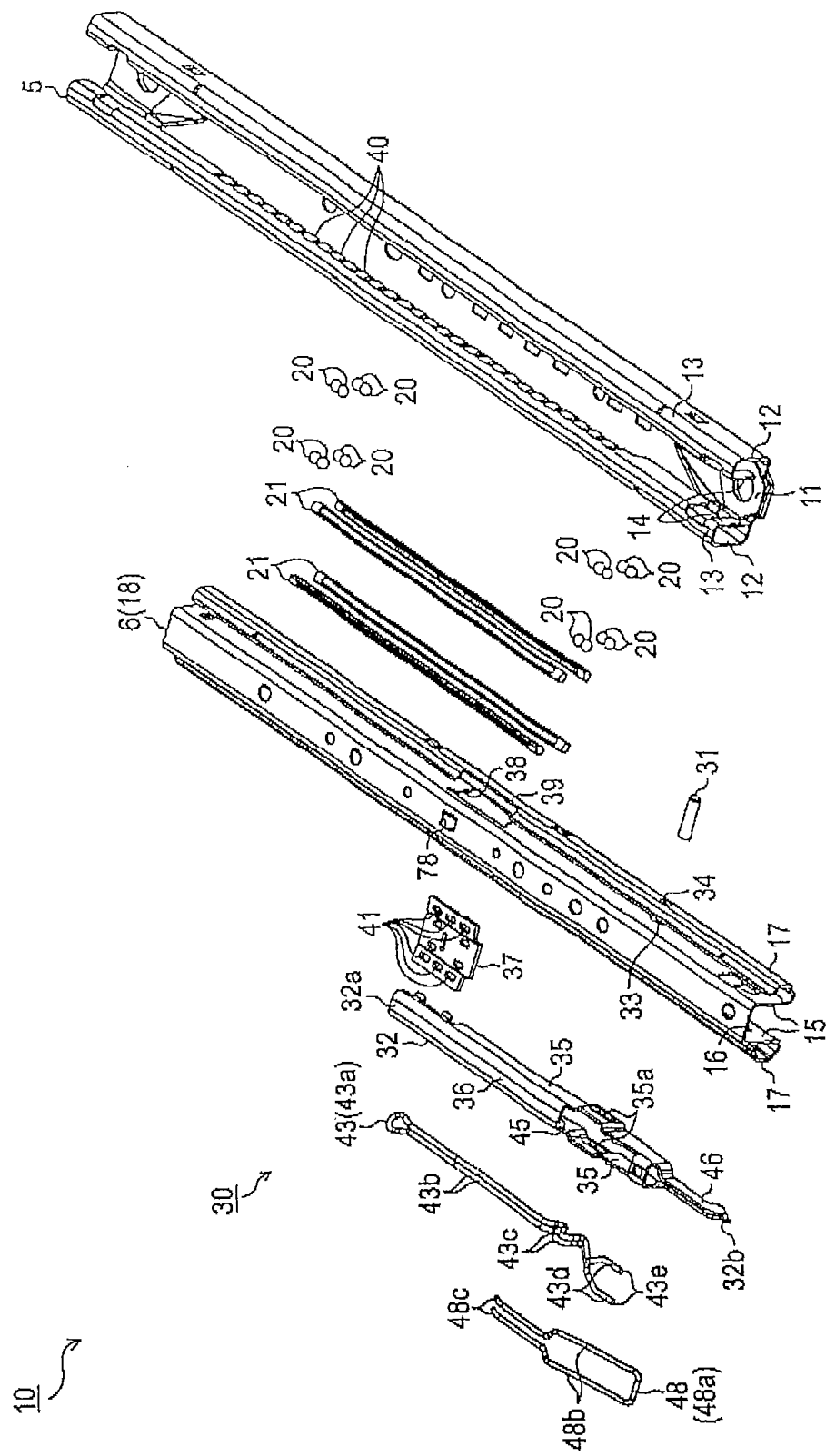

VEHICLE SEAT SLIDING APPARATUS

CROSS REFERENCE TO RELATED APPLICATIONS

This application is based on and claims priority under 35 U.S.C. §119 to Japanese Patent Application 2013-039093, filed on Feb. 28, 2013, the entire contents of which are incorporated herein by reference.

TECHNICAL FIELD

This disclosure relates to a vehicle seat sliding apparatus.

BACKGROUND DISCUSSION

In general, a vehicle seat sliding apparatus includes an upper rail that supports a seat thereabove, and a lower rail that supports the upper rail in a relatively movable manner. Also, in many seat sliding apparatuses, a locking mechanism that is capable of regulating the relative movement of the upper rail with respect to the lower rail is disposed as well. Further, configurations in which an unlock operation of the locking mechanism caused by a collision load is prevented by an unlock operation prevention mechanism disposed have been proposed.

For example, JP 2-126937UM-A (Reference 1) discloses an unlock operation prevention mechanism that has a blocking member which is moved forward based on the collision load during a forward collision of a vehicle. The blocking member that is moved forward regulates a rotation of a lock member so that the unlock operation of the locking mechanism is regulated.

Also, during the forward collision of the vehicle, the collision load causes a posture of a passenger in the seat to be changed. For example, JP 2011-213195A (Reference 2) discloses a method for correcting a sitting posture of the passenger with an airbag disposed in a seat cushion, in which a deployment pressure of the airbag is used to lift a bearing surface.

In other words, as shown in FIG. 22, the sitting posture of the passenger is in a state where the hands and feet thereof are extended to be thrown forward by inertia during the forward collision. In this case, a bearing surface 120s and the thigh of the passenger are lifted as shown in FIG. 23 if an airbag 121 that is disposed in a front portion side of a seat cushion 120 is deployed. In this manner, the feet are in an upright state to provide against an input of the collision load. In other words, the sitting posture is corrected into a posture with which a seat belt 123 that is disposed in the seat 122 and an airbag (not shown) for passenger protection deployed in front of the passenger function more effectively.

However, in a seat sliding apparatus 125, the deployment pressure of the airbag 121 that is disposed in the seat cushion 120 acts in a direction in which an upper rail 126 thereof is pushed downward to a lower side. In this manner, the upper rail 126 is bent and the locking mechanism thereof (not shown) ends up in the unlock operation.

In other words, in many seat sliding apparatuses, the locking mechanism can be unlock-operated when an operation lever 127 that is arranged in front of the seat 122 is pulled up. As such, a case where a front portion of the upper rail 126 is bent downward and a position of the operation lever 127 is in an unchanged state as shown in FIG. 23 is substantially equivalent to a state where the operation lever 127 thereof is pulled up. A timing at which the upper rail 126 is bent by the deployment pressure of the airbag 121 may not be consistent with a timing at which the unlock operation prevention mechanism using the above-described collision load is operated, and thus there is room for improvement with regard to this point.

SUMMARY

Thus, a need exists for a vehicle seat sliding apparatus which is not suspectable to the drawback mentioned above.

According to an aspect of this disclosure, it is preferable that a vehicle seat sliding apparatus includes an upper rail configured to support a seat thereabove; a lower rail supporting the upper rail in a relatively movable manner; a locking mechanism capable of switching between a lock state where the relative movement of the upper rail with respect to the lower rail is regulated and an unlock state where the relative movement is allowed; and an unlock operation prevention mechanism regulating an unlock operation of the locking mechanism based on a deployment pressure of an airbag which is disposed in a seat cushion.

According to this configuration, the unlock operation of the locking mechanism can be regulated at a timing when the deployment pressure of the airbag is transmitted to the upper rail. In this manner, the unlock operation caused by the deployment pressure of the airbag can be prevented and a position of the seat can be maintained with high reliability even during a collision.

With this configuration, the unlock operation of the locking mechanism caused by the deployment pressure of the airbag disposed in the seat cushion can be prevented with high reliability.

BRIEF DESCRIPTION OF THE DRAWINGS

The foregoing and additional features and characteristics of this disclosure will become more apparent from the following detailed description considered with the reference to the accompanying drawings, wherein:

FIG. 4 is an exploded perspective view of the seat sliding apparatus of the first embodiment.

DETAILED DESCRIPTION

First Embodiment

Hereinafter, a first embodiment of a vehicle seat sliding apparatus will be described with reference to the accompanying drawings.

Figure 1:
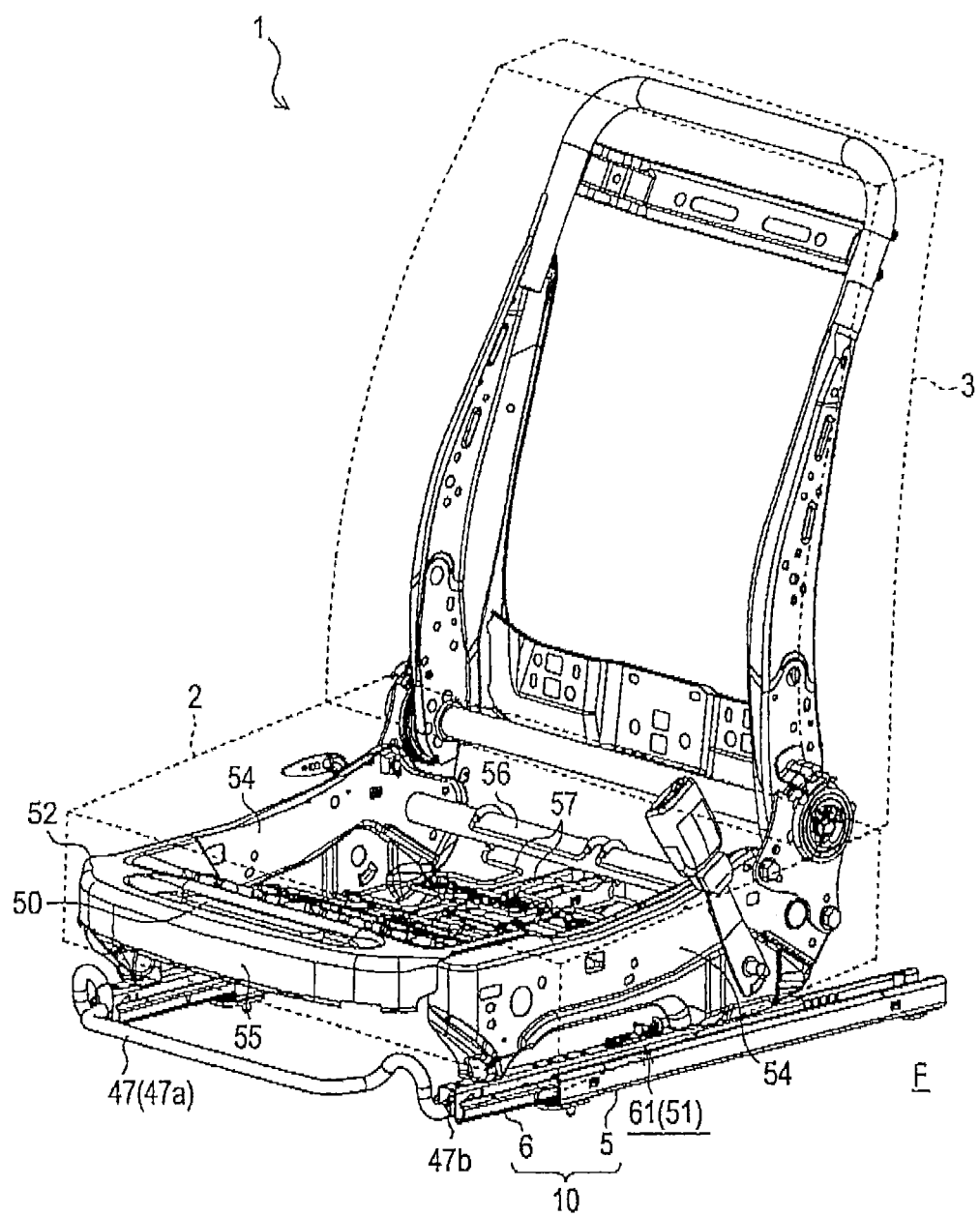
FIG. 1 is a perspective view of a seat of a first embodiment.
Figure 2:
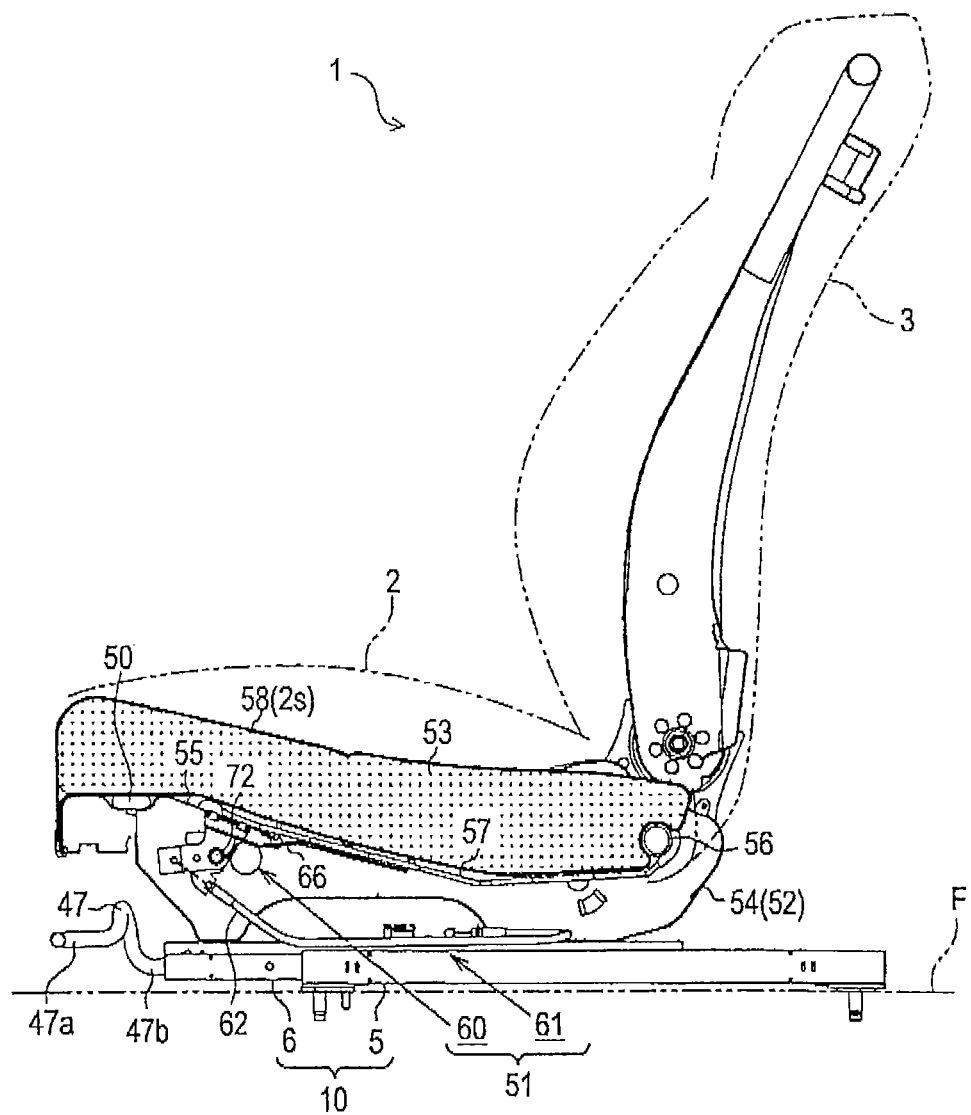
FIG. 2 is a side view of the seat of the first embodiment.

As shown in FIGS. 1 and 2, a vehicle seat 1 includes a seat cushion 2 and a seat back 3 that is disposed to be tiltable with respect to a rear end portion of the seat cushion 2. Also, a pair of lower rails 5 that are arranged in parallel are disposed in a vehicle floor portion F, and upper rails 6 that are relatively moved on the respective lower rails 5 are mounted on the respective lower rails 5. The seat cushion 2 of the seat 1 is supported on each of the upper rails 6.

In other words, in this embodiment, a seat sliding apparatus 10 is formed by the lower rails 5 and the upper rails 6 that are disposed to be capable of the relative movement. A vehicle passenger can adjust a position of the seat 1 in a vehicle front-back direction (left-right direction in FIG. 2) by using a function of the seat sliding apparatus 10.

In detail, as shown in FIGS. 3A, 3B, 4, and 5, the lower rail 5 has a flat plate-shaped bottom wall portion 11 that is a portion fixed to the vehicle floor portion F (refer to FIG. 2). Also, outer wall portions 12 are respectively erected at both width-direction (left-right direction in FIG. 5) ends of the bottom wall portion 11, and flange-shaped upper wall portions 13 that extend toward a width-direction inner side are respectively formed at respective upper ends (upper-side end portions in FIG. 5) of the outer wall portions 12. Folded portions 14 that are folded toward a lower side are respectively formed at respective tips of the upper wall portions 13.

The upper rail 6 has a pair of side wall portions 15 that are arranged to face each other in the width direction. Also, upper ends of the side wall portions 15 are connected with each other by a plate-shaped upper wall portion 16. Bent portions 17 that are folded toward width-direction outer sides of the respective side wall portions 15 are formed at respective lower ends of the side wall portions 15.

The upper rails 6 of this embodiment are mounted on the lower rails 5 in such a manner that a main body portion 18 which is formed by the pair of side wall portions 15 and the upper wall portion 16 and has a substantially U-shaped cross section is arranged between both of the folded portions 14 on a lower rail 5 side. Also, each of the bent portions 17 of the upper rail 6 extends to the upper side from the lower end of each of the side wall portions 15 along each of the outer wall portions 12 of the lower rails 5 facing each other in the width direction. Further, in the respective bent portions 17, curved concave surfaces Sa and Sb that extend along an extension direction of the upper rails 6 are respectively formed at a position facing a connection portion (curved concave surface Sc) between the bottom wall portion 11 and the outer wall portion 12 of the lower rail 5 and a position facing a connection portion (curved concave surface Sd) between the outer wall portion 12 and the upper wall portion 13. In this embodiment, ball-shaped rolling bodies 20 are respectively interposed between the curved concave surfaces Sa and Sb on upper rail 6 side and the curved concave surfaces Sc and Sd formed by bent shapes of the respective connection portions on the lower rail 5 side.

In other words, the rolling bodies 20 roll on tracks that are formed on rolling surfaces along the extension directions of the lower rails 5 and the upper rails 6 based on the relative movement between the lower rails 5 and the upper rails 6, the rolling surfaces being the curved concave surfaces Sa and Sb on the upper rail 6 side and the curved concave surfaces Sc and Sd on the lower rail 5 side. In this embodiment, a gap between each of the rolling bodies 20 and the rolling body 20 adjacent thereto in the extension directions (longitudinal direction) of the lower rails 5 and the upper rails 6 is maintained by respective long rod-shaped holding members 21 which are arranged on respective rolling paths along with the rolling bodies 20. In this embodiment, a smooth relative movement between the lower rails 5 and the upper rails 6 along the extension directions thereof is ensured in this manner.

Figure 3A:
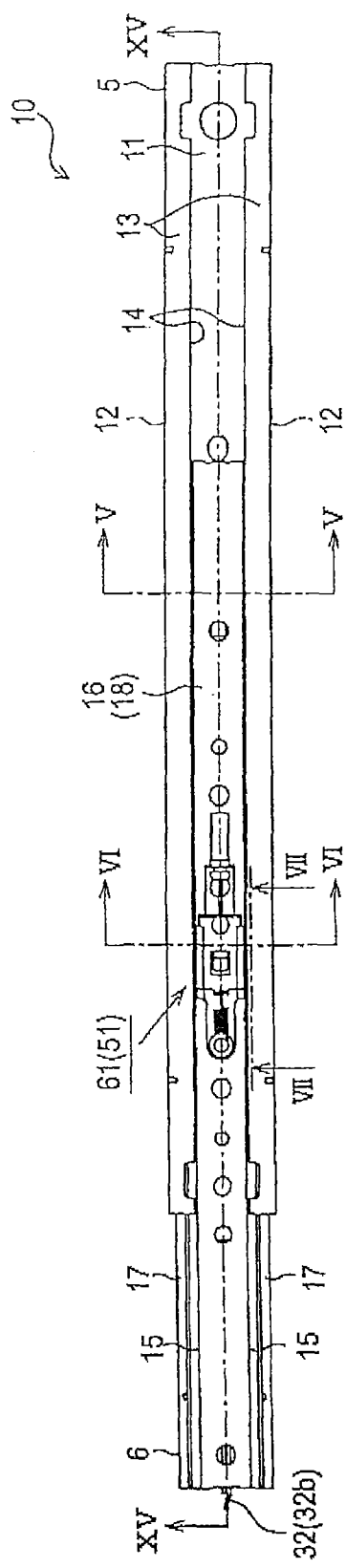
FIG. 3A is a plan view of a seat sliding apparatus of the first embodiment.
Figure 3B:
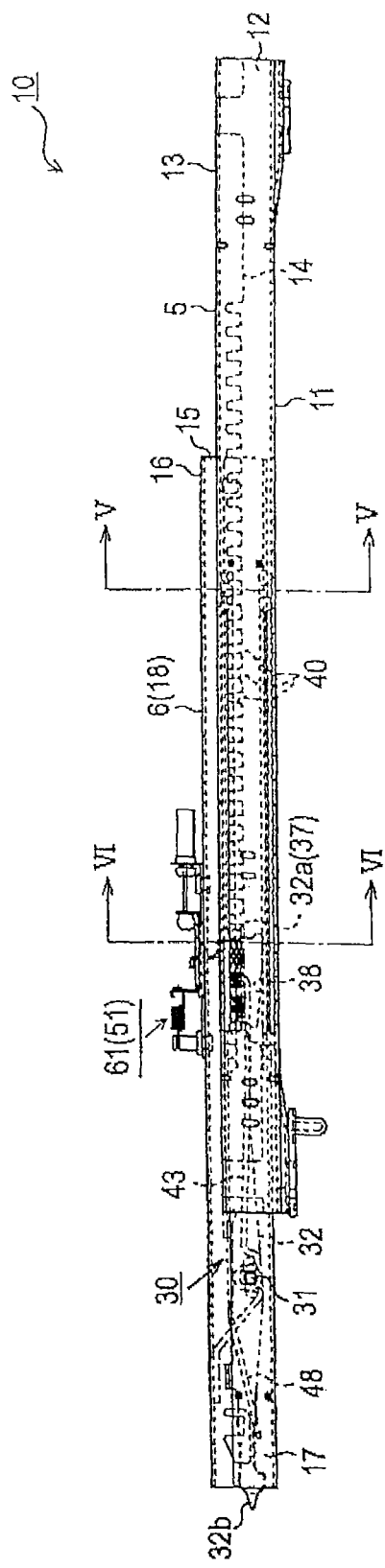
FIG. 3B is a side view of the seat sliding apparatus of the first embodiment.
Figure 5:
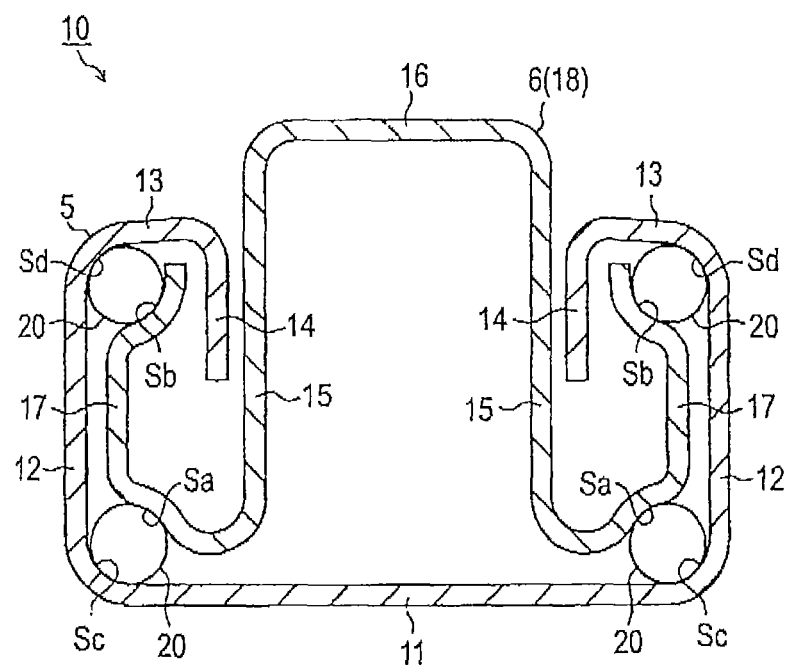
FIG. 5 is a cross-sectional view of the seat sliding apparatus of the first embodiment taken line V-V in FIGS. 3A and 3B.
Figure 6:
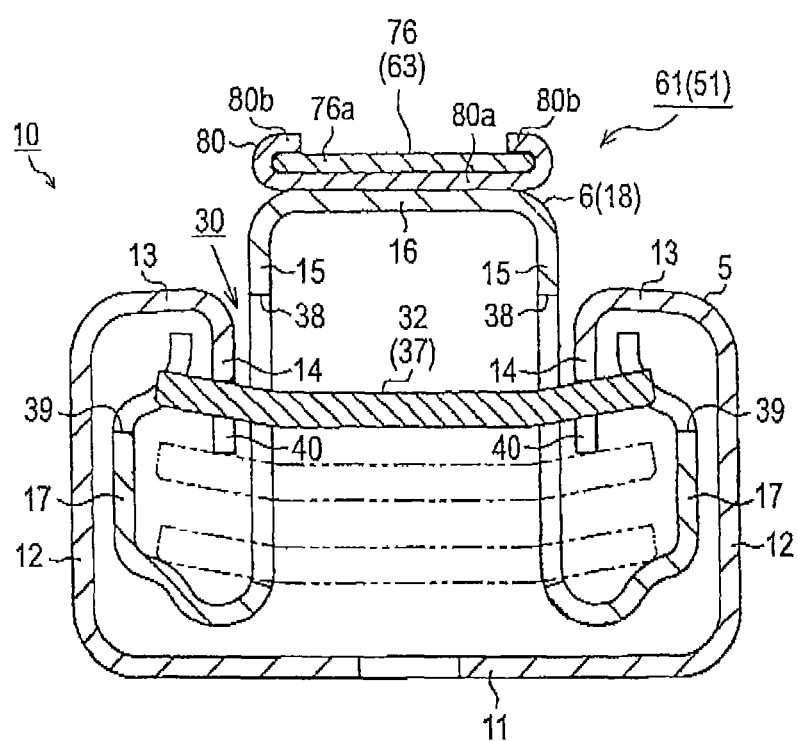
FIG. 6 is a cross-sectional view of the seat sliding apparatus of the first embodiment taken line VI-VI in FIGS. 3A and 3B.

Also, as shown in FIGS. 3B, 4 and 6, the seat sliding apparatus 10 of this embodiment has a locking mechanism 30 that is capable of regulating the relative movement between the lower rails 5 and the upper rails 6.

The locking mechanism 30 has a support shaft 31 that is supported by the upper rail 6 and a lock lever 32 that rotates about the support shaft 31. In this embodiment, bearing holes 33 that face each other are respectively formed in the side wall portions 15 of the upper rails 6. The support shaft 31 is bridged between both of the side wall portions 15 in such a manner that the vicinities of both end portions thereof are inserted into the respective bearing holes 33.

In this embodiment, circular through-holes 34 are also formed at positions of the bent portions 17 of the upper rails 6 corresponding to the bearing holes 33. The support shaft 31 is inserted into the respective bearing holes 33 via the through-holes 34.

The lock lever 32 has a pair of side plate portions 35 that are formed into a long plate shape and are arranged between both of the side wall portions 15 of the upper rails 6, and an upper plate portion 36 that connects upper end portions of the side plate portions 35 with each other. Also, long hole-shaped through-holes 35a that face each other are formed in the respective side plate portions 35. The lock lever 32 is supported in such a manner as to be rotatable about the support shaft 31 as the support shaft 31 is inserted into the through-holes 35a which are formed in both of the side plate portions 35.

Also, a lock portion 37 that has a substantially flat plate-like external shape and extends to the width-direction outer side is disposed at a tip 32a of the lock lever 32. Also, through-holes 38 into which the lock portion 37 is inserted are respectively formed at positions corresponding to the tip 32a of the lock lever 32 in the respective side wall portions 15 of the upper rails 6. In this embodiment, a notch 39 that is open upward is also formed at positions corresponding to the through-holes 38 in the bent portions 17 of the upper rails 6. Further, a plurality of engagement claws 40 that project downward are formed in a comb shape in the respective folded portions 14 of the lower rails 5. A plurality of engagement holes 41 that can be engaged with the respective engagement claws 40 on the lower rail 5 side are formed in the lock portion 37 of the lock lever 32.

In other words, in the locking mechanism 30 of this embodiment, both width-direction end parts of the lock portion 37 of the lock lever 32 are arranged outside the main body portion 18 that has a substantially U-shaped cross section via the through-holes 38 which are formed in the upper rails 6. In other words, when the lock lever 32 is rotated, the lock portion 37 that is disposed at the tip 32a moves upward and downward in the respective through-holes 38. In this manner, the lock portion 37 as an engaging portion is configured to be engaged with and disengaged from (engaged with and separated from) the respective engagement claws 40 set on the lower rail 5 side as engaged portions.

Figure 7:
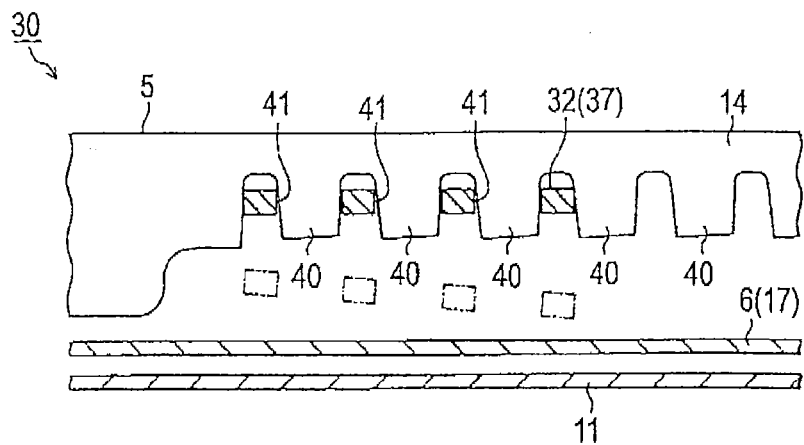
FIG. 7 is a cross-sectional view of the seat sliding apparatus of the first embodiment taken line VII-VII FIG. 3A.
Figure 8:
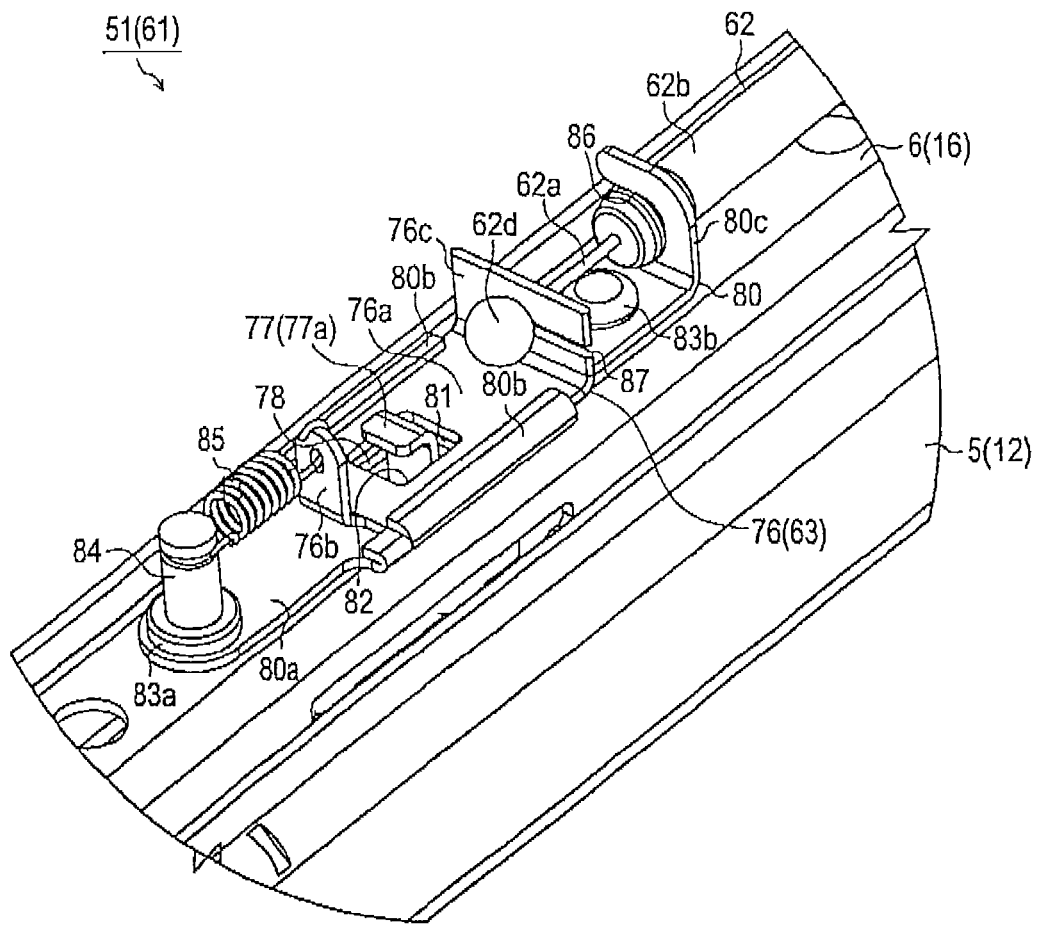
FIG. 8 is a perspective view of an unlock regulation device of the first embodiment.

Specifically, as shown in FIGS. 6 and 7 in this embodiment, the respective engagement holes 41 of the lock portion 37 are engaged with the engagement claws 40 on the lower rail 5 side when the lock lever 32 is rotated and the lock portion 37 that is disposed at the tip 32a is moved upward. In this manner, the relative movement between the lower rails 5 and the upper rails 6 can be regulated (lock state).

Also, when the lock portion 37 that is disposed at the tip 32a is moved downward, the engagement holes 41 of the lock portion 37 are disengaged from the respective engagement claws 40 on the lower rail 5 side. In this manner, the relative movement between the lower rails 5 and the upper rails 6 can be allowed (unlock state).

In further detail, as shown in FIGS. 3B and 4, the locking mechanism 30 of this embodiment has a spring member 43 that is formed by further bending a wire rod which is folded in half. The spring member 43 is arranged between both of the side plate portions 35 in a state where a bent end portion 43a folded in half abuts against the upper plate portion 36 of the lock lever 32, specifically, abuts against the tip 32a from a lower side.

Specifically, the spring member 43 has a first extending portion 43b that extends via an extension direction of the lock lever 32 from the bent end portion 43a, and a sealed portion 43c that is sealed from an upper side with respect to the support shaft 31 of the lock lever 32 by being bent into a substantially W shape. The spring member 43 further has a second extending portion 43d that is continuous from the sealed portion 43c and extends in the opposite direction to the first extending portion 43b.

In the lock lever 32 of this embodiment, an upper part of the support shaft 31 is an opening portion 45 where the upper plate portion 36 is not present. An open end portion 43e of the spring member 43 abuts against the upper wall portion 16 of the upper rail 6 from a lower side as the second extending portion 43d is inserted into the opening portion 45.

In other words, in the locking mechanism 30 of this embodiment, the lock lever 32 is biased by an elastic force of the spring member 43 in an upward movement direction of the lock portion 37 which is disposed at the tip 32a. In this manner, the lock state where the lock portion 37 is engaged with the respective engagement claws 40 on the lower rail 5 side is maintained.

Also, as shown in FIGS. 1 and 2, the locking mechanism 30 of this embodiment has an operation lever 47 that is operated to release the lock state. The operation lever 47 of this embodiment has a long rod-shaped operation unit 47a that extends in a direction substantially orthogonal to the extension direction of the upper rails 6, that is, the vehicle front-back direction. Also, the operation lever 47 of this embodiment is formed by bending a pipe material. Insertion portions 47b that are inserted into the main body portions 18 of the upper rails 6 from front sides of the respective upper rails 6 are respectively formed at both ends of the operation unit 47a.

As shown in FIGS. 3B and 4, the vicinity of a rear end 32b of the lock lever 32 of this embodiment is a narrow portion 46 that is formed by attaching both of the side plate portions 35 with each other. The operation lever 47 is connected to the rear end 32b of the lock lever 32 in a state where the narrow portion 46 of the lock lever 32 is inserted into both of the insertion portions 47b which form a tubular shape.

Also, the locking mechanism 30 of this embodiment has a second spring member 48 that is formed by further bending a wire rod which is folded in half as is the case with the spring member 43. Specifically, in the second spring member 48, a bent end portion 48a and an extending portion 48b that extends from the bent end portion 48a along the extension direction of the lock lever 32 are expanded to be wide in width. The second spring member 48 is externally fitted into the insertion portion 47b in a state where the bent end portion 48a abuts against the insertion portion 47b of the operation lever 47 from a lower side.

Also, the second spring member 48 is attached to the lock lever 32 so that an open end portion 48c abuts against the upper plate portion 36 of the lock lever 32 from a lower side. In this embodiment, a position of the operation lever 47 is maintained during a non-operation thereof based on an elastic force of the second spring member 48.

In other words, both of the insertion portions 47b of the operation lever 47 that are inserted into the upper rails 6 are moved upward when the operation unit 47a is operated to be pulled upward. Also, in this case, both of the insertion portions 47b lift the rear end 32b of the lock lever 32, and thus the lock lever 32 is rotated in a direction in which the tip 32a is moved to the lower side. In this manner, the locking mechanism 30 of this embodiment is configured to be in the unlock state where the relative movement of the upper rails 6 with respect to the lower rails 5 is allowed as the engagement between the respective engagement holes 41 on a lock lever 32 side and the respective engagement claws 40 on the lower rail 5 side is released.

Unlock Operation Prevention Mechanism

Next, an unlock operation prevention mechanism that is disposed in the seat sliding apparatus of this embodiment will be described.

As shown in FIG. 2 in this embodiment, an airbag 50 that is deployed based on a collision load during a vehicle collision is disposed below the seat cushion 2, specifically below a front end side thereof. As shown in FIGS. 8 to 12, an unlock operation prevention mechanism 51 that regulates an unlock operation of the locking mechanism 30 based on a deployment pressure of the airbag 50 is disposed in the seat sliding apparatus 10 of this embodiment.

In detail, as shown in FIGS. 1 and 2, the seat cushion 2 of this embodiment has a seat frame 52 that is supported by the left and right upper rails 6 and a cushion member 53 that is mounted on the seat frame 52.

The seat frame 52 of this embodiment is formed by connecting tip portions and rear end portions of the left and right side frames 54 that are fixed to the respective upper rails 6 with each other by respectively using a front frame 55 and a pipe frame 56. Also, a plurality of spring members (S springs) 57 that are bent into a crank shape are bridged between the front frame 55 and the pipe frame 56. The cushion member 53 is mounted on the spring members 57.

In this embodiment, the seat frame 52 and the cushion member 53 are covered by a cloth-shaped design material 58. In the seat cushion 2 of this embodiment, a bearing surface 2s thereof is formed by the design material 58.

Figure 9:
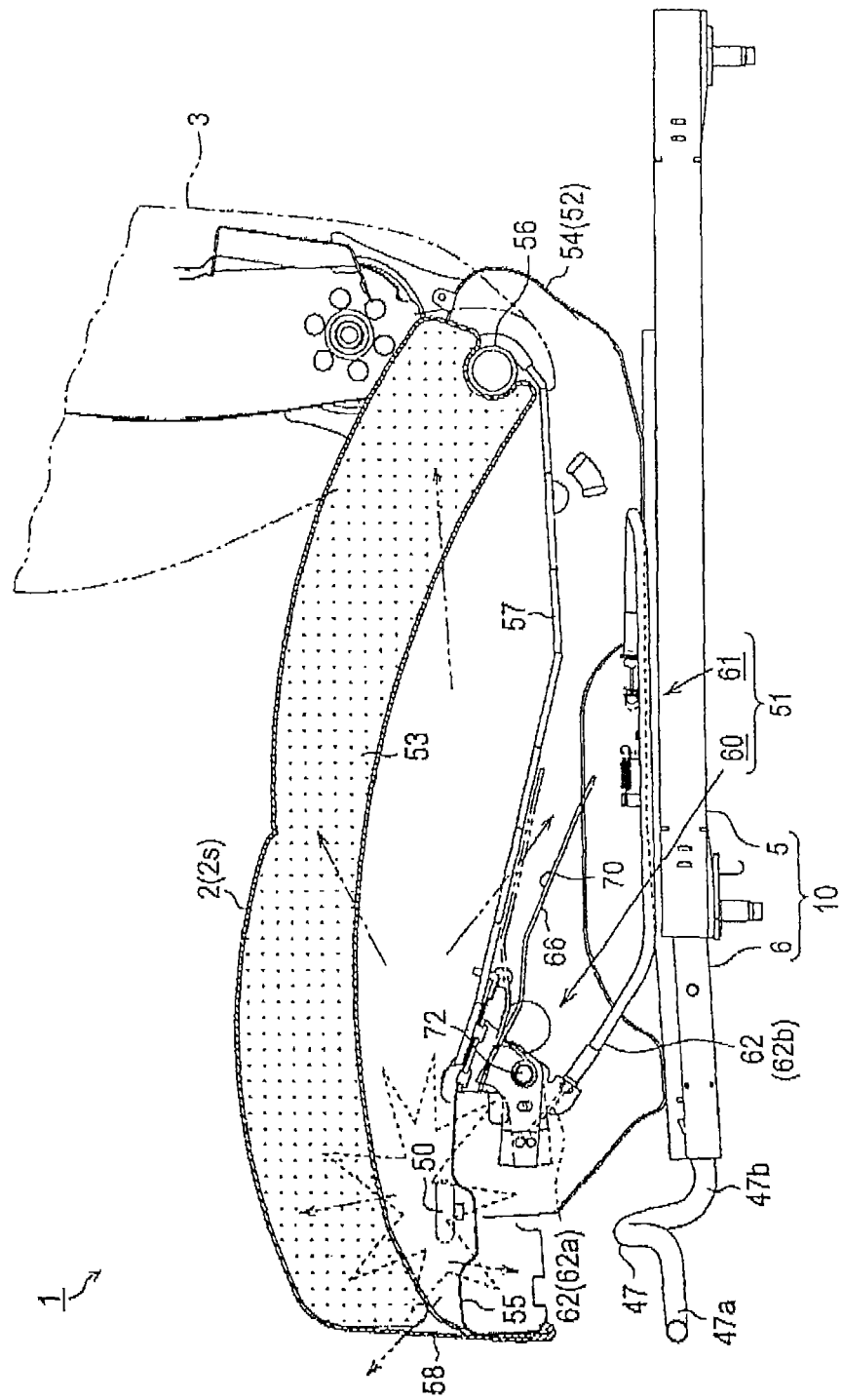
FIG. 9 is a side view of the seat of the first embodiment during airbag deployment.
Figure 23:
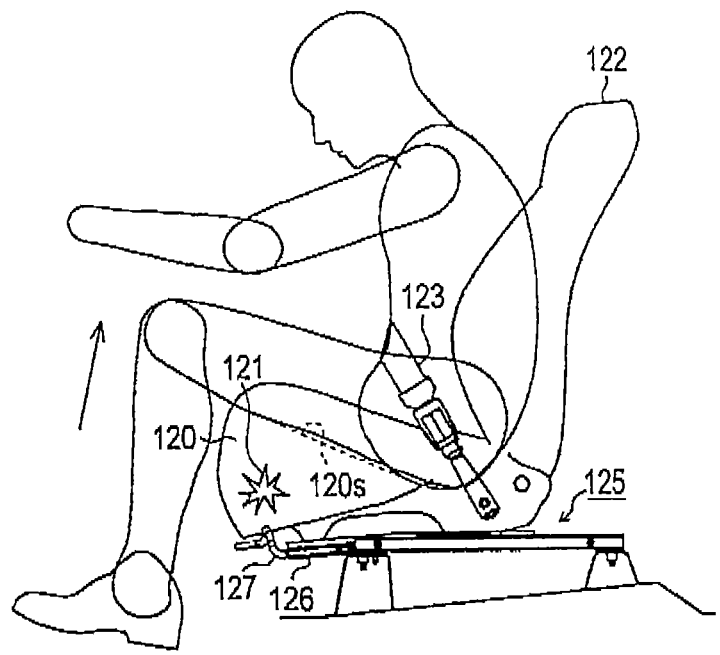
FIG. 23 is an explanatory view showing an operation of an airbag disposed in a seat cushion.

Also, as shown in FIGS. 1 and 2, the airbag 50 is disposed in the front frame 55. The airbag 50 of this embodiment is deployed by an inflator (not shown) when the vehicle collision load is detected. As shown in FIG. 9, a front portion (left-side end portion in the drawing) side of the bearing surface 2s can be lifted with the cushion member 53 by the deployment pressure so that a sitting posture of the passenger can be corrected to provide against an input of the collision load (refer to FIG. 23).

The unlock operation prevention mechanism 51 of this embodiment has a pressure-receiving device 60 that receives the deployment pressure of the airbag 50 as described above below the seat cushion 2, and an unlock regulation device 61 that is capable of regulating the rotation of the lock lever 32, specifically the rotation in an unlock direction in which the lock portion 37 is disengaged from the respective engagement claws 40 based on the deployment pressure.

In this embodiment, the deployment pressure of the airbag 50 is transmitted from the pressure-receiving device 60 to the unlock regulation device 61 via a wire cable 62 as a transmission member. The unlock regulation device 61 regulates the unlock-direction rotation of the lock lever 32 as described above as a regulation member 63 is operated based on the deployment pressure.

In further detail, as shown in FIGS. 10 to 13, the pressure-receiving device 60 of this embodiment has a bracket 65 that is fixed to a lower surface of the seat frame 52, and a lever member 66 that has a flat plate portion 66a which faces the respective spring members 57 below the spring members 57 and is rotatably supported by the bracket 65.

Figure 10:
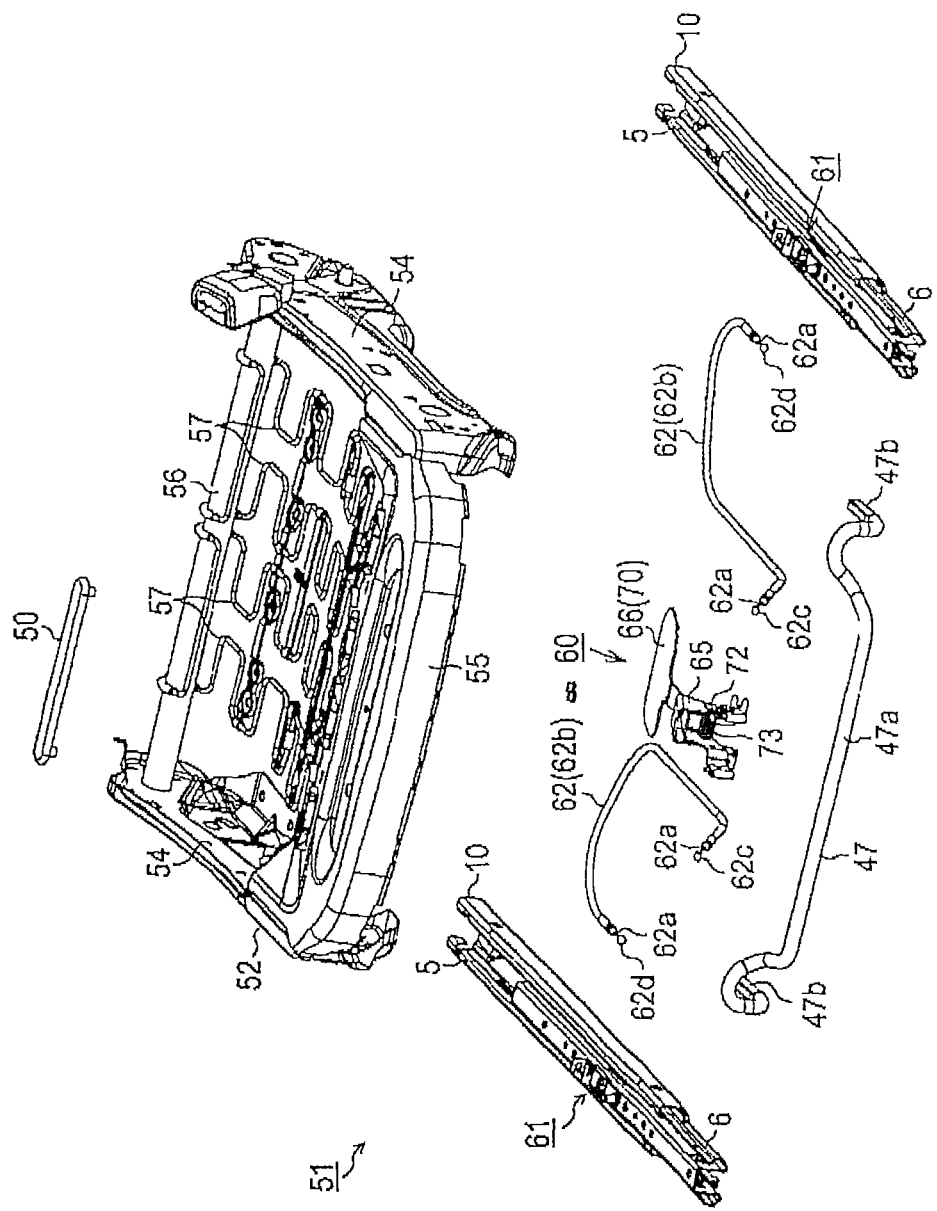
FIG. 10 is a perspective view showing a schematic configuration of an unlock operation prevention mechanism of the first embodiment.
Figure 11:
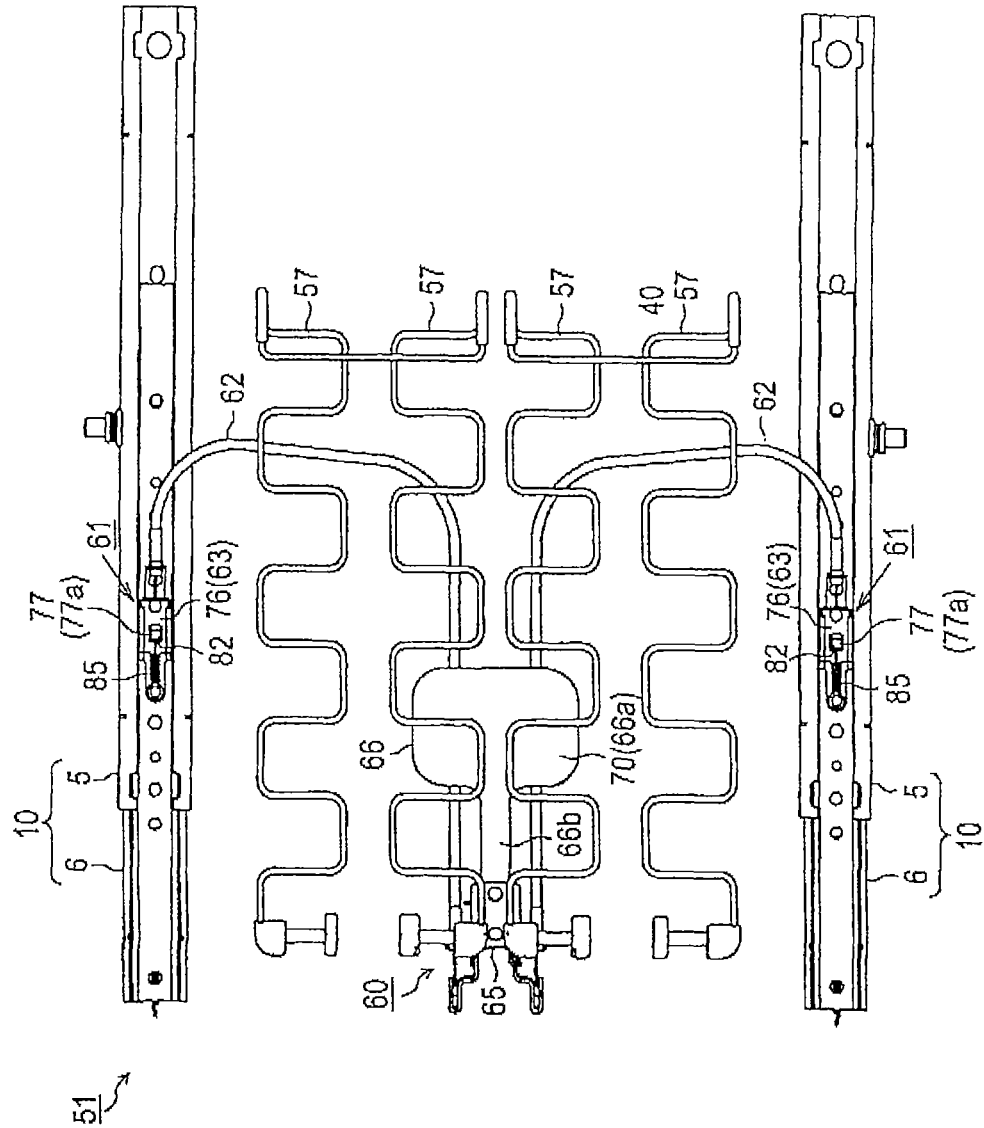
FIG. 11 is a plan view showing the schematic configuration of the unlock operation prevention mechanism of the first embodiment.
Figure 12:
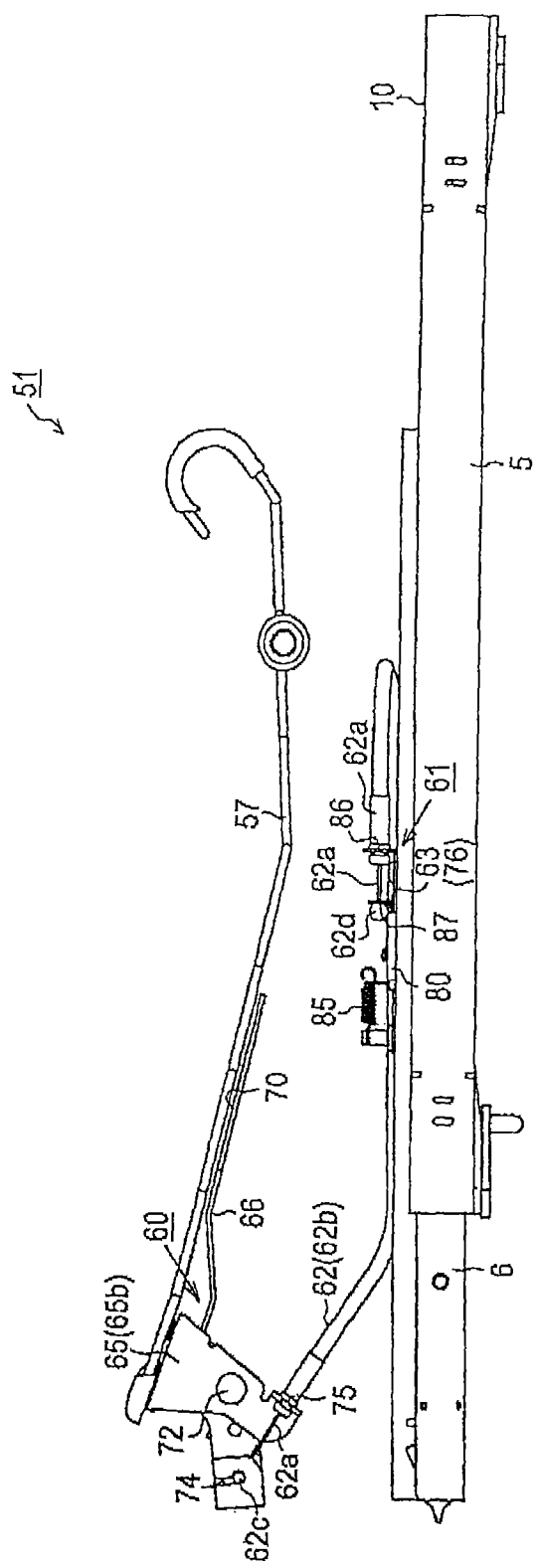
FIG. 12 is a side view showing the schematic configuration of the unlock operation prevention mechanism of the first embodiment.
Figure 13:
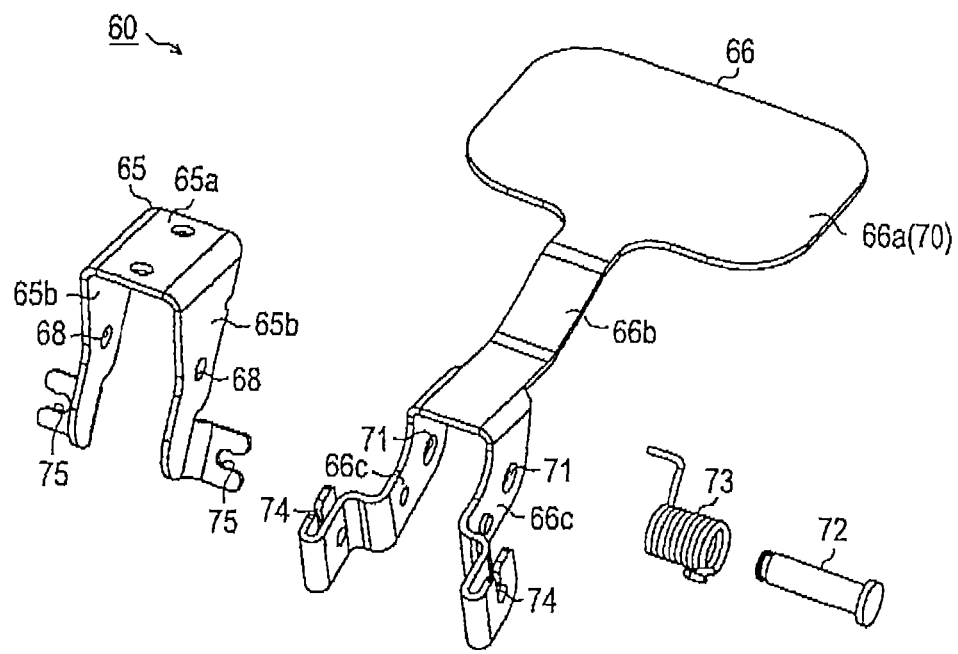
FIG. 13 is an exploded perspective view of a pressure-receiving device.

As shown in FIG. 13, the bracket 65 of this embodiment is formed by bending-processing a plate material into a substantially U shape. Also, through-holes 68 that face each other are respectively formed in a pair of left and right side plate portions 65b which are bent to project from a fixing portion 65a toward a lower side. As shown in FIGS. 10 to 12 in this embodiment, the bracket 65 is fixed to lock parts of the respective spring members 57 which are set in a rear end portion of the front frame 55.

As shown in FIG. 13 in this embodiment, the lever member 66 is also formed by bending-processing a plate material. Specifically, the lever member 66 has an extending portion 66b that is formed into an elongated and substantially rectangular flat plate shape, and the flat plate portion 66a that constitutes a pressure-receiving surface 70 has a larger area than the extending portion 66b and is disposed on one longitudinal-direction end side of the extending portion 66b. Also, a pair of left and right side plate portions 66c that are bent to project from both side end portions thereof to the lower side are formed on the other longitudinal-direction end side of the extending portion 66b. Further, the extending portion 66b has a width-direction (short-direction) length set in such a manner that the side plate portions 66c are arranged between both of the side plate portions 65b of the bracket 65. Also, through-holes 71 that face each other are formed in the respective side plate portions 66c as is the case with the side plate portions 65b of the bracket 65.

In other words, as shown in FIGS. 10 to 13, the lever member 66 of this embodiment is supported by the bracket 65 by using a support shaft 72 as the center of rotation as the support shaft 72 is inserted into the respective through-holes 71 and 68 which are formed in both of the side plate portions 66c and the respective side plate portions 65b of the bracket 65. Also, a torsional coil spring 73 is fitted onto the support shaft 72. The lever member 66 is biased in a direction in which the flat plate portion 66a approaches the respective spring members 57, that is, in a direction of upward rotation based on an elastic force of the torsional coil spring 73.

Also, in this embodiment, connection portions 74 for the wire cable 62 constituting the transmission member are formed on a further tip side than the through-holes 71 in the respective side plate portions 66c of the lever member 66. The wire cable 62 of this embodiment has a known structure formed by inserting a metallic wire 62a into a resinous tube 62b. A cable holding unit 75 that seals one end of the tube 62b is formed in each of the side plate portions 65b of the bracket 65.

In this embodiment, the cable holding unit 75 is configured to have a groove portion where the tube 62b of the wire cable 62 can be locked. The connection portion 74 for the wire cable 62 formed in the lever member 66 is configured to have a groove portion where a ball-shaped terminal portion 62c disposed at a tip of the wire 62a can be locked.

In other words, as shown in FIG. 9, the deployment pressure of the airbag 50 acts also in a direction in which the respective spring members 57 that are disposed in the seat frame 52 are pushed downward. The lever member 66 of this embodiment is rotated as the deployment pressure is received by (the pressure-receiving surface 70 of) the flat plate portion 66a. Specifically, the lever member 66 is rotated in such a manner that a tip side (left side in the drawing) of the side plate portion 66c where the connection portion 74 for the wire cable 62 is disposed is lifted as a tip side (right side in the drawing) of the extending portion 66b extending from the support shaft 72 that is the center of rotation toward a vehicle rear side is pushed downward. In this embodiment, (the wire 62a of) the wire cable 62 is pulled up by the rotation of the lever member 66 and the deployment pressure of the airbag 50 is transmitted to the unlock regulation device 61 that is disposed in the respective upper rails 6.

As shown in FIGS. 8 to 12, the unlock regulation device 61 of this embodiment is disposed in the upper wall portion 16 of the upper rail 6.

Figure 14:
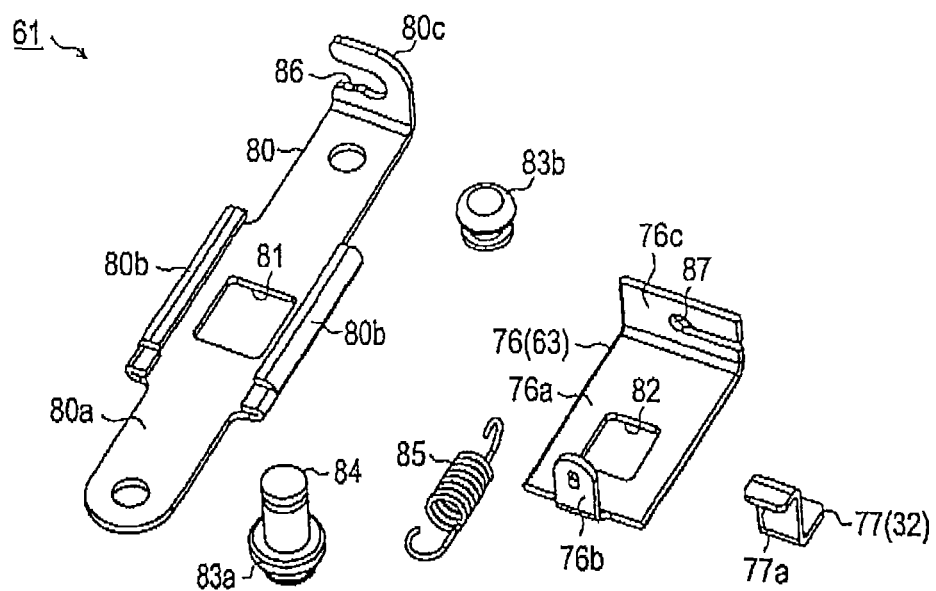
FIG. 14 is an exploded perspective view of the unlock regulation device of the first embodiment.
Figure 15:
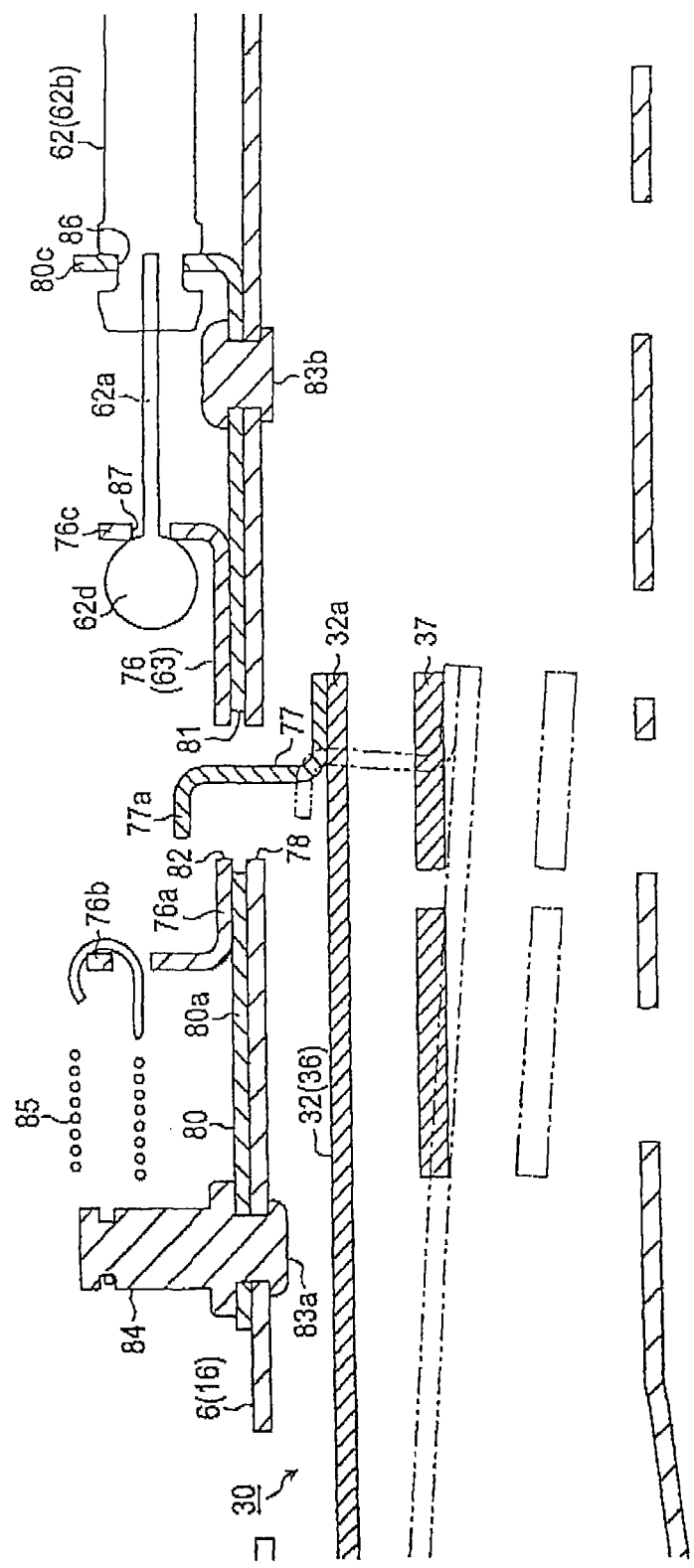
FIG. 15 is a cross-sectional view of the seat sliding apparatus in the vicinity of the unlock regulation device of the first embodiment in a usual case taken line XV-XV in FIG. 3A.
Figure 16:
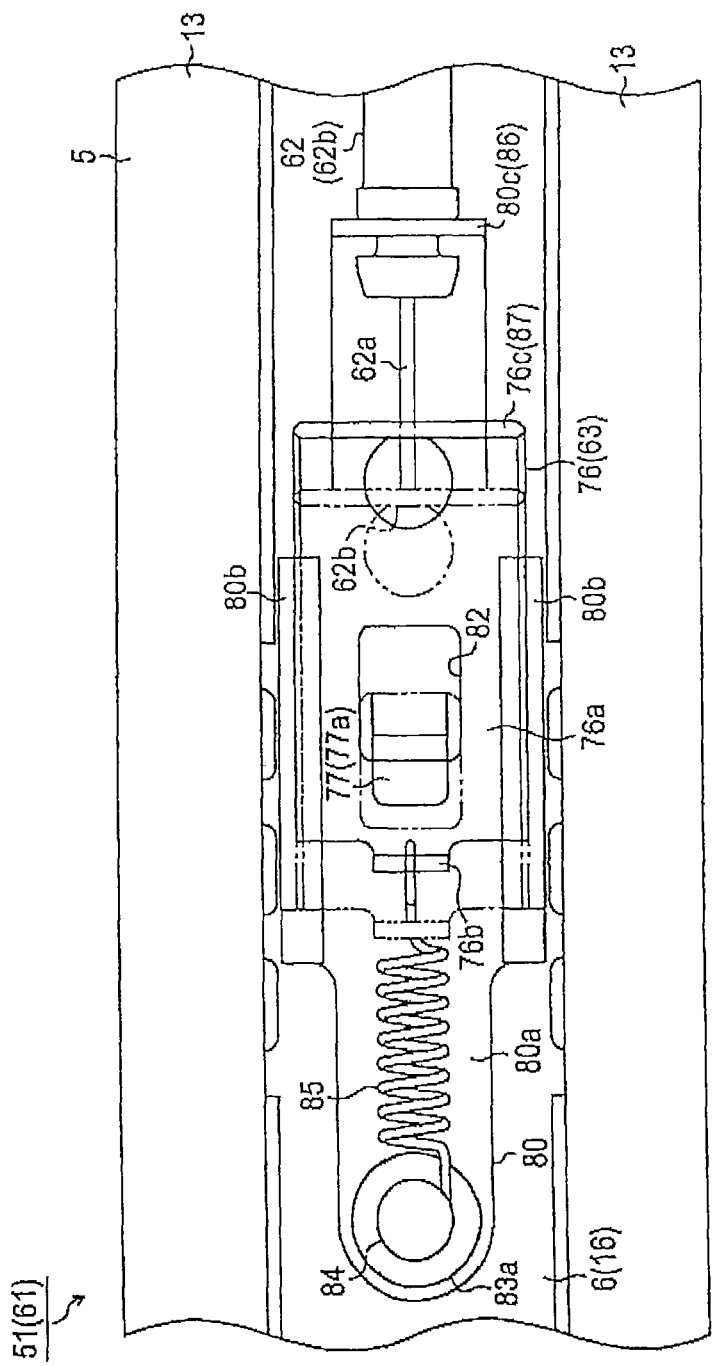
FIG. 16 is a plan view of the unlock regulation device of the first embodiment during airbag deployment.

Specifically, as shown in FIGS. 14 to 16 in this embodiment, a slider 76 that moves on the upper wall portion 16 based on the deployment pressure of the airbag 50 which is transmitted via the wire cable 62 is disposed in the upper wall portion 16 of each of the upper rails 6. Also, a projecting portion 77 that extends upward from the upper plate portion 36 is disposed at the tip 32a of the lock lever 32. A through-hole 78 into which the projecting portion 77 is inserted is formed in the upper wall portion 16 of the upper rail 6.

The slider 76 of this embodiment has a flat plate portion 76a that is formed into a substantially rectangular shape. Also, the projecting portion 77 that is disposed in the lock lever 32 has a plate shape which has a thickness in the extension direction (left-right direction in FIG. 15) of the lock lever 32, and a tip 77a thereof is bent toward a base end side (left side in FIG. 15) of the lock lever 32. The unlock regulation device 61 of this embodiment can regulate the unlock-direction rotation of the lock lever 32 as the slider 76 that is moved based on the deployment pressure of the airbag 50 is engaged with the projecting portion 77 projecting from the upper wall portion 16 via the through-hole 78.

In further detail, in this embodiment, a bracket 80 that holds the slider 76 as the regulation member 63 in a slidable manner is disposed on the upper wall portion 16 of the upper rail 6. Specifically, the bracket 80 has an elongated and substantially rectangular flat plate-shaped base portion 80a that extends along the extension direction of the upper rail 6. Also, a pair of guiding units 80b that are formed by folding both width-direction ends of the base portion 80a are formed in the bracket 80. The slider 76 of this embodiment is held by the bracket 80 in a state where both width-direction ends of the flat plate portion 76a are fitted into the guiding units 80b and can be moved on the upper wall portion 16 of the upper rail 6 along the extension direction thereof.

Also, a through-hole 81 that is substantially equal in size to (slightly larger in diameter than) the through-hole 78 is formed in the base portion 80a of the bracket 80 at a position corresponding to the through-hole 78 which is formed in the upper wall portion 16 as described above. Further, a through-hole 82 that is substantially equal in size to the through-hole 78 is formed also in the flat plate portion 76a of the slider 76 which slides on the base portion 80a. In the unlock regulation device 61 of this embodiment in a usual case, a position of the slider 76 is maintained so that the through-hole 82 is consistent with the through-hole 78 of the upper wall portion 16 and the through-hole 81 of the bracket 80.

Specifically, the slider 76 of this embodiment has upright portions 76b and 76c that are bent upward in both longitudinal-direction end portions thereof. Also, both longitudinal-direction ends of the base portion 80a of the bracket 80 of this embodiment are fastened to the upper wall portion 16 by rivets 83a and 83b, and a columnar portion 84 that projects from the upper wall portion 16 is formed in the rivet 83a on a vehicle front side (left side in FIG. 15). A coil spring 85 as an elastic member is interposed between the columnar portion 84 and the upright portion 76b of the slider 76 which faces the columnar portion 84.

Also, the bracket 80 of this embodiment has an upright portion 80c that is bent upward on the vehicle rear side (right side in FIG. 15) of the base portion 80a. Further, a cable holding unit 86 that seals one end of the wire cable 62, specifically the tube 62b, as the transmission member is formed in the upright portion 80c. A connection portion 87 for the wire cable 62 where the tip of the wire 62a projecting from the tube 62b is sealed is formed in the upright portion 76c of the slider 76 facing the upright portion 80c.

In this embodiment, the cable holding unit 86 is configured to have a groove portion where the tube 62b of the wire cable 62 can be locked. The connection portion 87 for the wire cable 62 that is disposed in the upright portion 76c of the slider 76 is also configured to have a groove portion where a ball-shaped terminal portion 62d disposed at the tip of the wire 62a can be locked.

In other words, in this embodiment, the slider 76 as the regulation member 63 is biased to the vehicle front side based on an elastic force of the coil spring 85 which is sealed in the upright portion 76b on the vehicle front side, In this manner, in a usual case, the through-hole 82 is held at a position consistent with the through-hole 78 of the upper wall portion 16 and the through-hole 81 of the bracket 80.

Next, an effect of the unlock operation prevention mechanism 51 that has the above-described configuration will be described.

As shown in FIG. 15, in a usual case where the airbag 50 that is disposed in the seat cushion 2 is not deployed (refer to FIG. 2), the through-hole 82 of the slider 76 that constitutes the regulation member 63 of the unlock regulation device 61 is held at a position consistent with the through-hole 78 of the upper wall portion 16 formed in the upper rail 6 and the through-hole 81 of the bracket 80. Accordingly, the lock lever 32 can be freely rotated in a state where the projecting portion 77 that is disposed at the tip 32a thereof rises above the upper wall portion 16 via the through-holes 78, 81, and 82. In this manner, the usual unlock operation that is based on the operation of the operation lever 47 described above is ensured.

In a case where the airbag 50 is deployed (refer to FIG. 9), the deployment pressure is transmitted to the unlock regulation device 61 as the lever member 66 that constitutes the pressure-receiving device 60 pulls up (the wire 62a of) the wire cable 62 as the transmission member.

Figure 17:
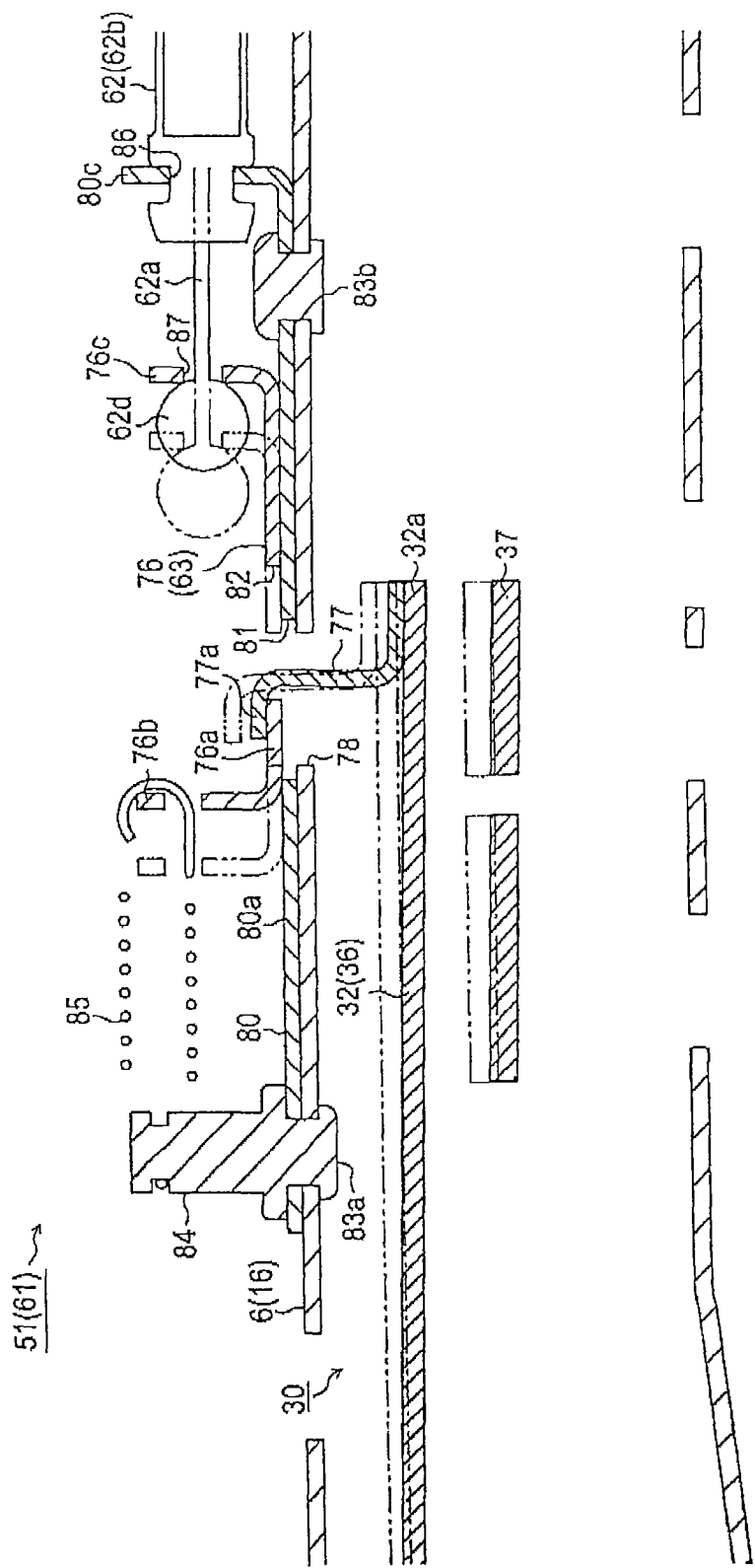
FIG. 17 is a cross-sectional view of the seat sliding apparatus in the vicinity of the unlock regulation device of the first embodiment during airbag deployment taken line XV-XV in FIG. 3A.

In other words, as shown in FIGS. 16 and 17, the slider 76 is moved to the vehicle rear side (right side in each of the drawings) on the upper wall portion 16 in this case based on a tensile force of the wire cable 62. In this manner, the slider 76 is engaged with the projecting portion 77 of the lock lever 32 and the rotation of the lock lever 32 is regulated in a direction in which the tip 32a thereof is moved downward.

Specifically, when the through-hole 82 of the slider 76 is moved to a position shifted from the through-hole 78 of the upper wall portion 16 and the through-hole 81 of the bracket 80, the bent tip 77a of the projecting portion 77 of the lock lever 32 that projects from the upper wall portion 16 via the respective through-holes 78, 81, and 82 is caught by the flat plate portion 76a of the slider 76. In this manner, the projecting portion 77 cannot be put into the upper rail 6, and thus the operation of the lock lever 32 is regulated in a direction in which the lock portion 37 as the engaging portion thereof is separated from the engagement claw 40 set in the lower rail 5 as the engaged portion, that is, the unlock direction.

The following effects can be achieved according to this embodiment described above.

(1) In the unlock operation prevention mechanism 51 of this embodiment, the unlock operation of the locking mechanism 30 is regulated based on the deployment pressure of the airbag 50 that is disposed in the seat cushion 2. By using this configuration, the unlock operation of the locking mechanism 30 can be regulated at a timing when the deployment pressure of the airbag 50 is transmitted to the upper rail 6. In this manner, the unlock operation caused by the deployment pressure of the airbag 50 can be prevented and the position of the seat can be maintained with high reliability even during the collision.

(2) The unlock operation prevention mechanism 51 has the pressure-receiving device 60 that receives the deployment pressure of the airbag 60 below the seat cushion 2, and the unlock regulation device 61 that has the regulation member 63 which is capable of regulating the rotation of the lock lever 32 in a direction in which the lock portion 37 is separated from the respective engagement claws 40 set in the lower rail 5 through the operation based on the deployment pressure.

In other words, the deployment pressure of the airbag 50 lifts the bearing surface 2s of the seat cushion 2 and, at the same time, acts in a direction in which the members arranged below the seat cushion 2 are pushed downward. As such, according to the above-described configuration, the unlock regulation device 61 can be operated at an optimum timing. The rotation of the lock lever 32 that is a main component of the locking mechanism 30 can be regulated directly, and thus the unlock operation thereof can be regulated with high reliability.

(3) The pressure-receiving device 60 has the lever member 66 that is rotated by receiving the deployment pressure of the airbag 50. The regulation member 63 of the unlock regulation device 61 is connected to the lever member 66 via the wire cable 62 as the transmission member.

According to the above-described configuration, the deployment pressure of the airbag 50 is converted to the tensile force of the wire cable 62 by the rotation of the lever member 66. In this manner, the regulation member 63 can be operated with reliability and the simple configuration.

(4) The lever member 66 has the extending portion 66b that is formed into an elongated and substantially rectangular flat plate shape, and the flat plate portion 66a that constitutes the pressure-receiving surface 70 which is disposed on the one longitudinal-direction end side of the extending portion 66b. In this manner, the deployment pressure of the airbag 50 can be received with high efficiency.

(5) The upper rail 6 has the pair of side wall portions 15 and the upper wall portion 16 that connects the upper ends of the respective side wall portions 15 with each other, and the lock lever 32 has the support shaft 31 intersecting between both of the side wall portions 15 and is rotatably supported. Also, the projecting portion 77 that projects upward is disposed at the tip 32a of the lock lever 32. The through-hole 78 into which the projecting portion 77 is inserted, the slider 76 as the regulation member 63 that is moved on the upper wall portion 16 based on the deployment pressure of the airbag 50, and the bracket 80 that has the guiding units 80b which guides the slider 76 to a position of the engagement with the projecting portion 77 are disposed in the upper wall portion 16 of the upper rail 6.

According to the above-described configuration, the rotation of the lock lever 32 is regulated as the slider 76 as the regulation member 63 is engaged with the tip 77a of the projecting portion 77 of the lock lever 32. In this manner, the unlock operation of the locking mechanism 30 caused by the deployment pressure of the airbag 50 can be prevented with high reliability.

Second Embodiment

Hereinafter, a second embodiment according to the vehicle seat sliding apparatus will be described with reference to the accompanying drawings. For convenience of description, the same reference numerals will be used to refer to the same elements as in the first embodiment and the description will be omitted.

Figure 18:
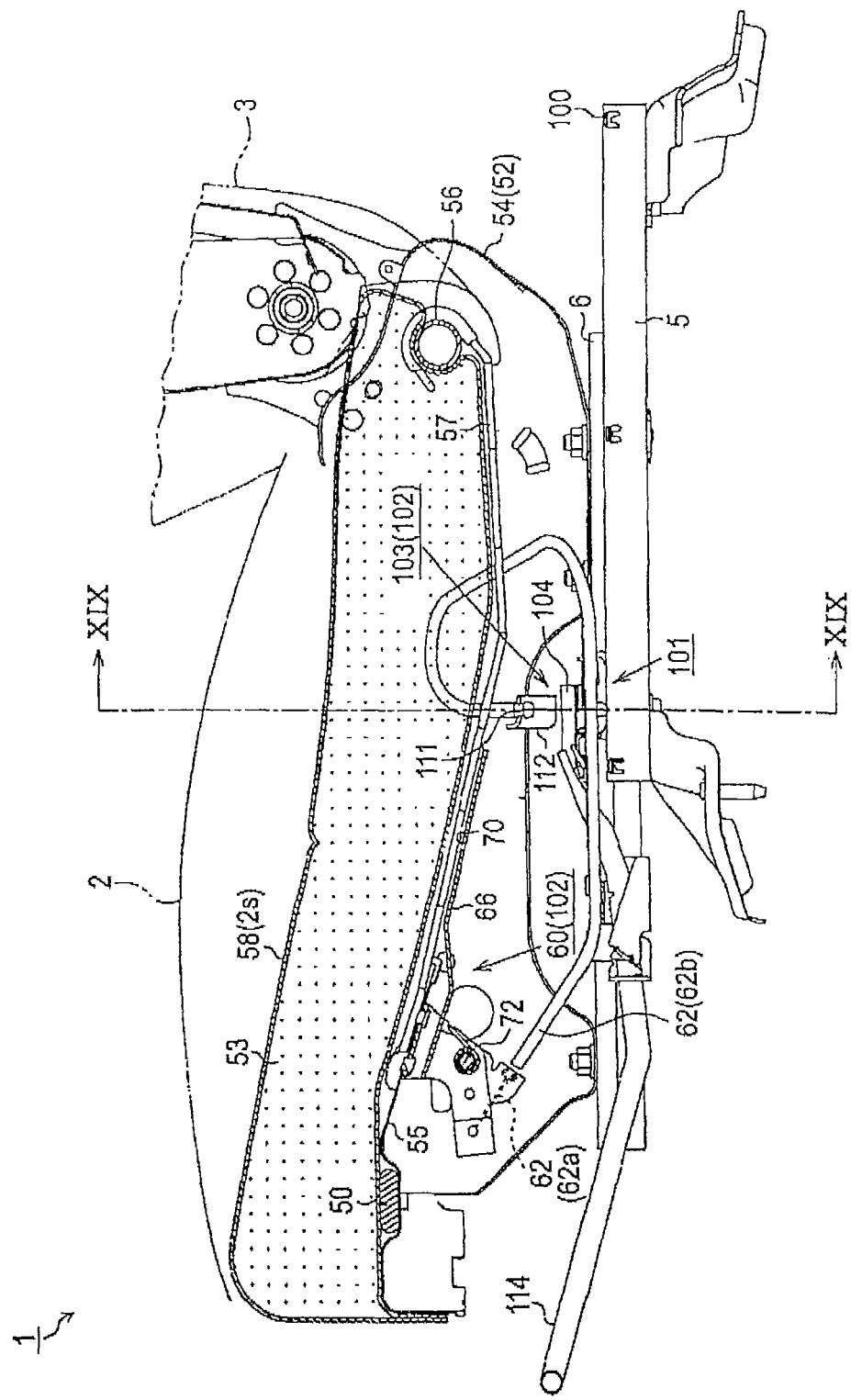
FIG. 18 is a side view of a seat showing a schematic configuration of an unlock operation prevention mechanism of a second embodiment.
Figure 19:
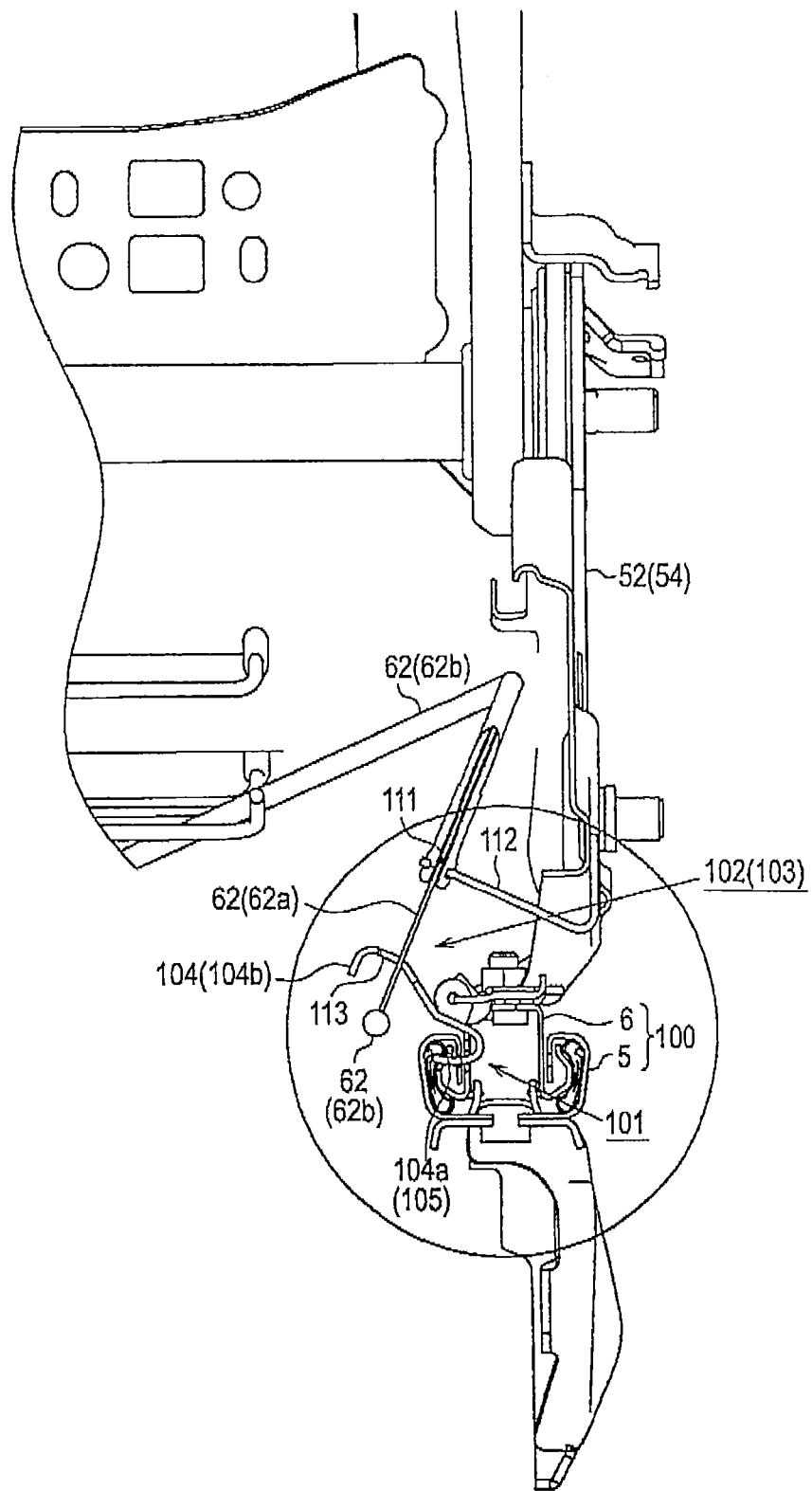
FIG. 19 is a cross-sectional view of the seat showing the schematic configuration of the unlock operation prevention mechanism of the second embodiment taken line XIX-XIX in FIG. 18.

As shown in FIGS. 18 and 19, the seat sliding apparatus 100 of this embodiment is different from the first embodiment in configurations of a locking mechanism 101 and an unlock operation prevention mechanism 102, specifically an unlock regulation device 103 thereof.

Figure 20:
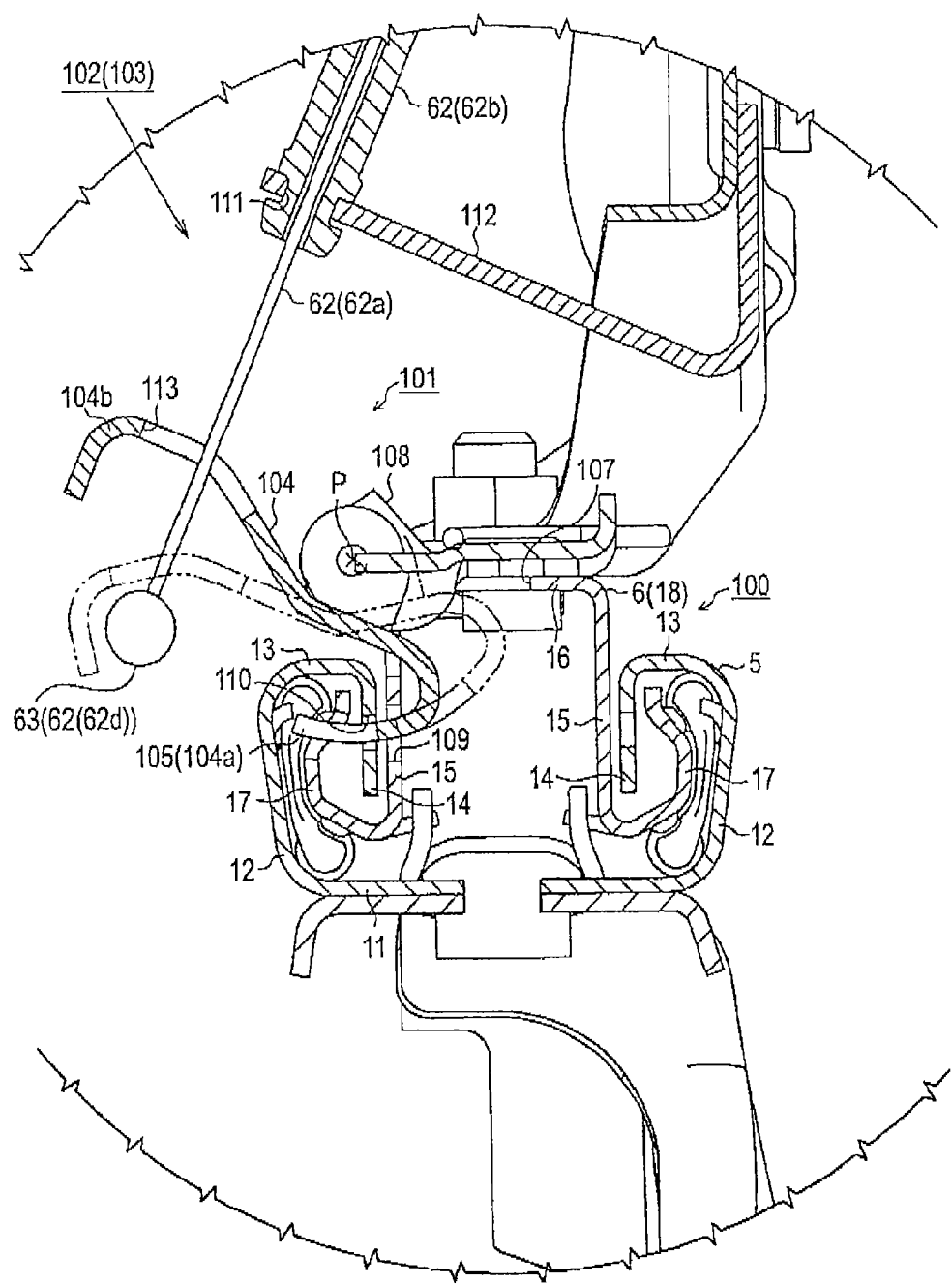
FIG. 20 is an enlarged cross-sectional view of the seat showing a schematic configuration of an unlock regulation device of the second embodiment in a usual case taken line XIX-XIX in FIG. 18.

In detail, as shown in FIG. 20, a lock lever 104 of the locking mechanism 101 of this embodiment has a comb-shaped engagement claw 105 as an engaging portion on one end thereof (insertion end 104a). Also, in this embodiment, a mounting hole 107 of the lock lever 104 is formed in the upper rail 6 in such a manner that one corner portion of the main body portion 18 which has a U-shaped cross section is cut out. Further, a supporting member 108 that has a rotating shaft (not shown, position shown by a point P in FIG. 20) which extends in a direction along the extension direction of the upper rail 6 and supports the lock lever 104 in a rotatable manner is disposed in the upper wall portion 16 of the upper rail 6. The lock lever 104 is supported by the supporting member 108 in a state where the other end (projecting end 104b) side projects out of the upper rail 6 via the mounting hole 107.

In this embodiment, the engagement claw 105 of the lock lever 104 is formed by bending an insertion end 104a side that is arranged in the upper rail 6 into a substantially U shape. Also, a plurality of through-holes 109 into which the engagement claw 105 of the lock lever 104 can be inserted are formed in the side wall portion 15 of the upper rail 6 where the mounting hole 107 is formed at a further lower-side position than the mounting hole 107. In the folded portion 14 of the lower rail 5, a plurality of engagement holes 110 that are engaged portions are formed in a row along the extension direction thereof.

In the locking mechanism 101 of this embodiment, the lock lever 104 is rotation-biased based on an elastic force of a spring member (not shown) in a direction in which the projecting end 104b thereof is lifted upward, that is, in a direction in which the engagement claw 105 is engaged with the respective engagement holes 110 of the lower rail 5. In this manner, in a usual case, the relative movement between the upper rail 6 and the lower rail 5 is regulated in the lock state.

Further, in the locking mechanism 101 of this embodiment, the projecting end 104b of the lock lever 104 is pushed to the lower side (refer to FIG. 18) as the passenger pulls an operation lever 114 upward. In this manner, the lock lever 104 is rotated and the engagement claw 105 is separated from the respective engagement holes 110 of the lower rail 5 so that the relative movement between the upper rail 6 and the lower rail 5 is allowed in the unlock state.

Also, as shown in FIGS. 18 to 20 in this embodiment, a bracket 112 that has a cable holding unit 111 which seals one end of the wire cable 62, specifically the tube 62b thereof, as the transmission member transmitting the deployment pressure of the airbag 50 from the pressure-receiving device 60 is mounted on the respective side frames 54 constituting the seat frame 52.

Specifically, the bracket 112 is disposed above the locking mechanism 101, specifically at a position where the cable holding unit 111 is arranged above the projecting end 104b of the lock lever 104. Also, an insertion hole 113 into which the wire 62a that projects from the tube 62b held by the cable holding unit 111 is inserted is formed at the projecting end 104b of the lock lever 104. In this embodiment, the insertion hole 113 has a long hole shape that has a width which is slightly larger than the diameter of the wire 62a and extends in a longitudinal direction of the lock lever 104 (substantially left-right direction in FIG. 20). The terminal portion 62d that has a shape (size) which cannot pass through the insertion hole 113 is mounted on the tip of the wire 62a.

In other words, as shown in FIG. 20, in a usual case where the airbag 50 that is disposed in the seat cushion 2 is not deployed (refer to FIG. 2), the terminal portion 62d that is disposed at the tip of the wire 62a as described above is positioned on a further lower side than a position of the projecting end 104b of the lock lever 104 shown by a two-dot chain line in the drawing and corresponding to the unlock state of the locking mechanism 30. Accordingly, the lock lever 104 can be rotated in a direction of downward movement, that is, the unlock direction without the projecting end 104b interfering with the terminal portion 62d of the wire 62a. In this embodiment, the usual unlock operation that is based on the operation of the operation lever 114 described above is ensured in this manner.

Figure 21:
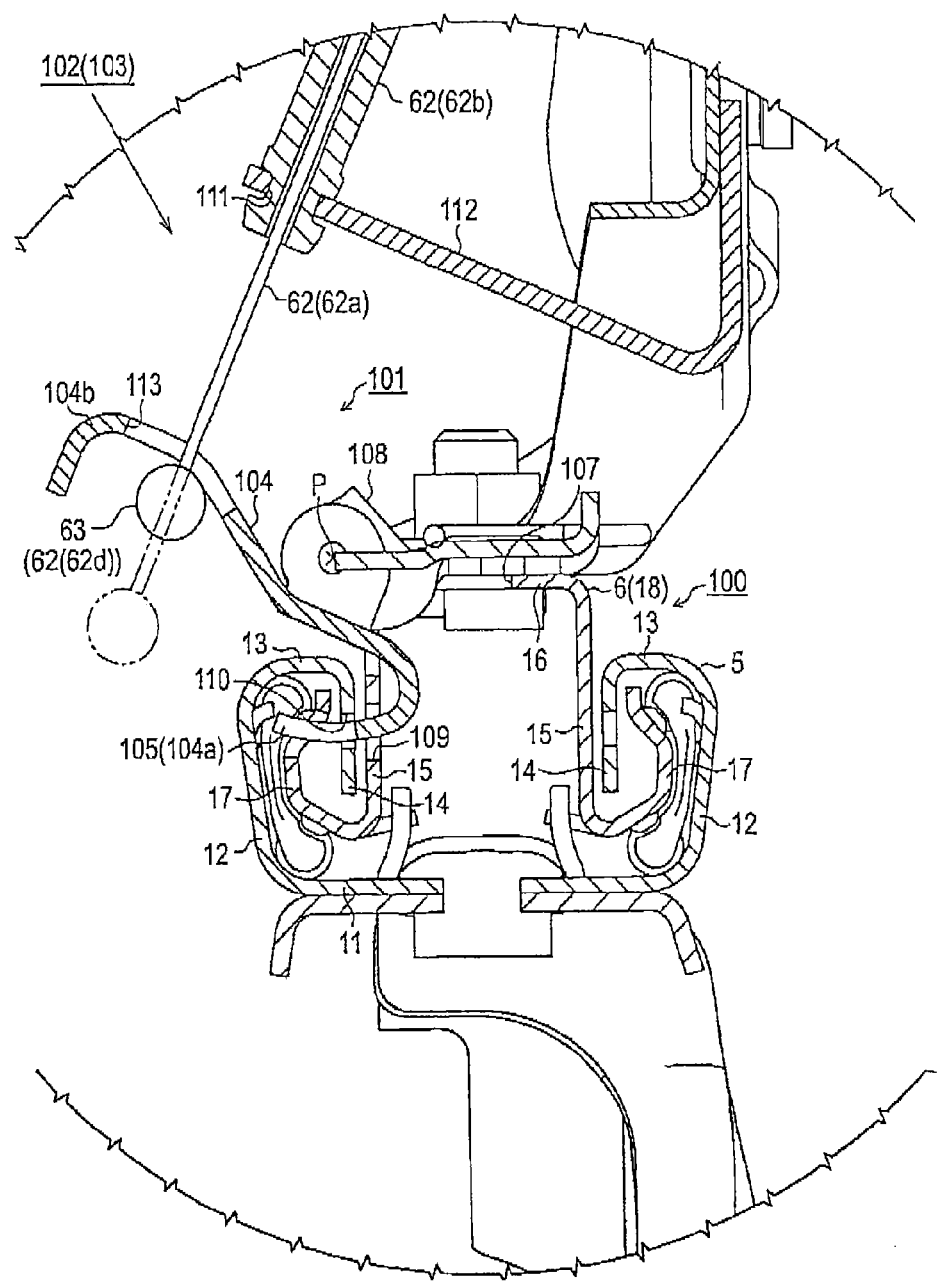
FIG. 21 is an enlarged cross-sectional view of the seat showing the schematic configuration of the unlock regulation device of the second embodiment during airbag deployment taken line XIX-XIX in FIG. 18.
Figure 22:
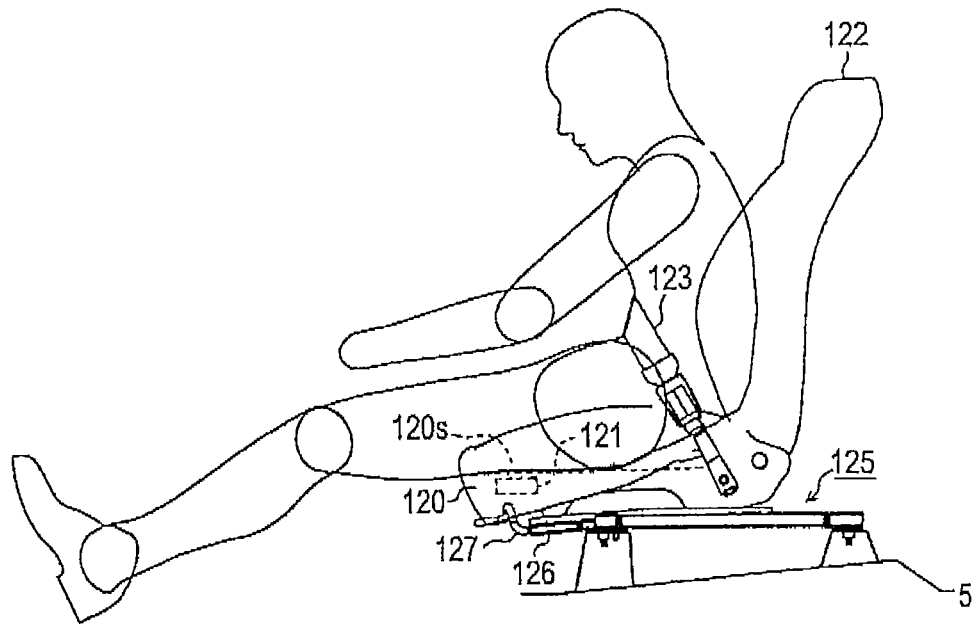
FIG. 22 is an explanatory view showing a relationship between the seat and a passenger during a forward collision.

In a case where the airbag 50 is deployed (refer to FIG. 9) as shown in FIG. 21, the terminal portion 62d of the wire 62a is pulled upward by the deployment pressure. In this manner, the terminal portion 62d of the wire 62a that is inserted into the insertion hole 113 is engaged with the projecting end 104b of the lock lever 104, and the rotation of the lock lever 104 is regulated in a direction in which the projecting end 104b is moved to the lower side.

In other words, in the unlock operation prevention mechanism 102 of this embodiment, the unlock regulation device 103 is configured in such a manner that the tip of the wire 62a, that is, the terminal portion 62d which is disposed on the one end side inserted into the insertion hole 113 is the regulation member 63. In this embodiment, the unlock operation caused by the deployment pressure of the airbag 50 can be prevented by the simple configuration in this manner.

Each of the embodiments described above may be changed as follows.

In the first embodiment, the pressure-receiving device 60 has the lever member 66 that is rotated by receiving the deployment pressure of the airbag 50, and the slider 76 as the regulation member 63 is connected to the lever member 66 via the wire cable 62. The slider 76 is moved in the upper wall portion 16 of the upper rail 6 based on the tensile force of the wire cable 62 caused by the rotation of the lever member 66. However, the configurations of the pressure-receiving device and the transmission member of each of the embodiments described above are not limited thereto but may be changed. For example, a rod, a ring, or the like may be used as the transmission member to transmit the deployment pressure of the airbag 50 to the unlock regulation device 61. Also, the lever member 66 may be configured to push the transmission member by using the rotation thereof. A configuration in which a pipe line is used to transmit the deployment pressure can also be considered.

Also, the configuration of the unlock regulation device 61 of the first embodiment such as the shape and the direction of movement of the slider 76 may be changed appropriately. Also, the operation of the regulation member 63 may be based on not only sliding but also rotation.

Further, the locking mechanism 30 of the first embodiment is in the unlock state when the lock portion 37 of the lock lever 32 is moved downward. However, the locking mechanism 30 is not limited thereto but may also be in the unlock state when the engaging portion of the lock lever is moved upward.

In each of the embodiments described above, the regulation member 63 (76, and 62d) is configured to directly regulate the rotation of the lock levers 32 and 104, but the operation of the lock lever may be regulated indirectly as well.

Also, in the second embodiment, the transmission member may be formed of any material if the transmission member is configured to be inserted into the insertion hole 113 which is formed at the projecting end 104b of the lock lever 104.

Further, the position where the regulation member 63 is disposed may be changed if the unlock-direction rotation of the lock lever 104 can be regulated in a state where the regulation member 63 that is moved by the deployment pressure of the airbag 50 is engaged with the projecting end 104b of the lock lever 104, that is, in a state where the regulation member 63 cannot pass through the insertion hole 113 into which the transmission member is inserted.

According to an aspect of this disclosure, it is preferable that a vehicle seat sliding apparatus includes an upper rail configured to freely support a seat thereabove; a lower rail supporting the upper rail in a relatively movable manner; a locking mechanism capable of switching between a lock state where the relative movement of the upper rail with respect to the lower rail is regulated and an unlock state where the relative movement is allowed; and an unlock operation prevention mechanism regulating an unlock operation of the locking mechanism based on a deployment pressure of an airbag which is disposed in a seat cushion.

According to this configuration, the unlock operation of the locking mechanism can be regulated at a timing when the deployment pressure of the airbag is transmitted to the upper rail. In this manner, the unlock operation caused by the deployment pressure of the airbag can be prevented and a position of the seat can be maintained with high reliability even during a collision.

In the vehicle seat sliding apparatus according to the aspect of this disclosure, it is preferable that the locking mechanism includes a lock lever that has an engaging portion which is engaged with and disengaged from an engaged portion set in the lower rail and is supported by the upper rail, and the unlock operation prevention mechanism includes a pressure-receiving device that receives the deployment pressure of the airbag below the seat cushion, and an unlock regulation device that has a regulation member which is capable of regulating an operation of the lock lever in which the engaging portion is separated from the engaged portion when operated based on the deployment pressure transmitted from the pressure-receiving device.

That is, the deployment pressure of the airbag lifts a bearing surface of the seat cushion and, at the same time, acts in a direction in which the members arranged below the seat cushion are pushed downward. As such, according to this aspect, the unlock regulation device can be operated at an optimum timing. The operation of the lock lever that is a main component of the locking mechanism can be regulated directly, and thus the unlock operation thereof can be regulated with high reliability.

In the vehicle seat sliding apparatus according to the aspect of this aspect, it is preferable that the pressure-receiving device has a lever member that is rotated by receiving the deployment pressure, and the regulation member of the unlock regulation device is connected to the lever member via a transmission member.

With this configuration, the deployment pressure of the airbag is converted into a tensile force, a pushing force, or the like using the transmission member as a medium by the rotation of the lever member. In this manner, the regulation member can be operated with the simple configuration and high reliability.

In the vehicle seat sliding apparatus according to the aspect of this disclosure, it is preferable that the upper rail has a pair of side wall portions and an upper wall portion that connects the side wall portions with each other, the lock lever has a support shaft that intersects with both of the side wall portions and is supported in a rotatable manner, a projecting portion that projects upward is formed in the lock lever, and a through-hole into which the projecting portion is inserted, the regulation member that is moved on the upper wall portion based on the deployment pressure, and a guiding unit that guides the regulation member to a position of engagement with the projecting portion are disposed in the upper wall portion of the upper rail.

With this configuration, the regulation member that is moved by the deployment pressure of the airbag is engaged with the projecting portion of the lock lever so that the rotation of the lock lever is regulated. The reliable operation can be ensured as the regulation member is moved in a state of being guided in the upper wall portion of the upper rail. As a result, the unlock operation of the locking mechanism caused by the deployment pressure of the airbag can be prevented with high reliability.

In the vehicle seat sliding apparatus according to the aspect of this disclosure, it is preferable that the lock lever has a projecting end that projects out of the upper rail and is supported in a rotatable manner, an insertion hole into which the transmission member is inserted is formed at the projecting end of the lock lever, and the regulation member has a shape with which the regulation member cannot pass through the insertion hole and is disposed in the transmission member.

With this configuration, the unlock-direction rotation of the lock lever can be regulated in a state where the regulation member that is moved by the deployment pressure of the airbag is engaged with the projecting end of the lock lever, that is, in a state where the regulation member cannot pass through the insertion hole into which the transmission member is inserted. In this manner, the unlock operation of the locking mechanism caused by the deployment pressure of the airbag can be prevented with the simple configuration and high reliability.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat sliding apparatus comprising:
   an upper rail configured to support a seat thereabove;
   a lower rail supporting the upper rail in a relatively movable manner;
   a locking mechanism capable of switching between a lock state where the relative movement of the upper rail with respect to the lower rail is regulated and an unlock state where the relative movement is allowed; and
   an unlock operation prevention mechanism regulating an unlock operation of the locking mechanism based on a deployment pressure of an airbag which is disposed in a seat cushion.

2. The vehicle seat sliding apparatus according to claim 1, wherein
   the locking mechanism includes a lock lever that has an engaging portion which is engaged with and disengaged from an engaged portion set in the lower rail and is supported by the upper rail, and
   the unlock operation prevention mechanism includes:
      a pressure-receiving device receiving the deployment pressure of the airbag below the seat cushion; and
      an unlock regulation device having a regulation member which is capable of regulating an operation of the lock lever in which the engaging portion is separated from the engaged portion when operated based on the deployment pressure transmitted from the pressure-receiving device.

3. The vehicle seat sliding apparatus according to claim 2, wherein
   the pressure-receiving device has a lever member that is rotated by receiving the deployment pressure, and
   the regulation member of the unlock regulation device is connected to the lever member via a transmission member.

4. The vehicle seat sliding apparatus according to claim 3, wherein
   the upper rail has a pair of side wall portions and an upper wall portion that connects the side wall portions with each other,
   the lock lever has a support shaft that intersects with both of the side wall portions and is supported in a rotatable manner,
   a projecting portion that projects upward is formed in the lock lever, and
   a through-hole into which the projecting portion is inserted, the regulation member that is moved on the upper wall portion based on the deployment pressure, and a guiding unit that guides the regulation member to a position of engagement with the projecting portion are disposed in the upper wall portion of the upper rail.

5. The vehicle seat sliding apparatus according to claim 3, wherein
   the lock lever has a projecting end that projects out of the upper rail and is supported in a rotatable manner,
   an insertion hole into which the transmission member is inserted is formed at the projecting end of the lock lever, and
   the regulation member has a shape with which the regulation member cannot pass through the insertion hole and is disposed in the transmission member.

* * * * *